US011301677B2

(12) United States Patent  
Molin et al.

(10) Patent No.: US 11,301,677 B2  
(45) Date of Patent: Apr. 12, 2022

(54) DEEP LEARNING FOR THREE DIMENSIONAL (3D) GAZE PREDICTION

(71) Applicant: Tobii AB, Danderyd (SE)

(72) Inventors: David Molin, Danderyd (SE);  
Tommaso Martini, Danderyd (SE);  
Maria Gordon, Danderyd (SE);  
Alexander Davies, Danderyd (SE);  
Oscar Danielsson, Danderyd (SE)

(73) Assignee: Tobil AB, Danderyd (SE)

( * ) Notice: Subject to any disclaimer, the term of this patent is extended or adjusted under 35 U.S.C. 154(b) by 17 days.

(21) Appl. No.: 16/901,377

(22) Filed: Jun. 15, 2020

(65) Prior Publication Data

US 2021/0042520 A1 Feb. 11, 2021

(30) Foreign Application Priority Data

Jun. 14, 2019 (SE) .................................... 1950723-5

(51) Int. Cl.
| | |
|---|---|
| *G06K 9/00* | (2006.01) |
| *G06T 7/70* | (2017.01) |
| *G06K 9/62* | (2022.01) |
| *G06N 3/04* | (2006.01) |
| *G06N 3/08* | (2006.01) |

(52) U.S. Cl.  
CPC ..... *G06K 9/00604* (2013.01); *G06K 9/00248* (2013.01); *G06K 9/6217* (2013.01); *G06N 3/04* (2013.01); *G06N 3/08* (2013.01); *G06T 7/70* (2017.01); *G06T 2207/20084* (2013.01); *G06T 2207/30201* (2013.01)

(58) Field of Classification Search  
CPC ............. G06K 9/6217; G06K 9/00248; G06K 9/00597; G06K 9/00604; G06K 9/6271; G06N 3/08; G06N 3/04; G06N 3/0445; G06N 3/084; G06T 7/70; G06T 7/73; G06T 2207/30201; G06T 2207/20084; G06T 2207/20081; G06T 2207/30041  
See application file for complete search history.

(56) References Cited

U.S. PATENT DOCUMENTS

| 7,747,068 B1 * | 6/2010 | Smyth ................ G06K 9/00604 |
| | | 382/154 |
| 9,993,154 B2 * | 6/2018 | Ninomiya ............... A61B 3/113 |
| 2014/0218281 A1 * | 8/2014 | Amayeh ................. G06F 1/163 |
| | | 345/156 |
| 2017/0091535 A1 * | 3/2017 | Yu ....................... G06K 9/00248 |
| 2018/0089834 A1 * | 3/2018 | Spizhevoy ................ G06T 7/10 |
| 2019/0147228 A1 * | 5/2019 | Chaudhuri ......... G06K 9/00288 |
| | | 382/118 |

* cited by examiner

*Primary Examiner* — Syed Haider  
(74) *Attorney, Agent, or Firm* — Samuel I. Yamron

(57) ABSTRACT

There is disclosed a computer implemented eye tracking system and corresponding method and computer readable storage medium, for detecting three dimensional, 3D, gaze, by obtaining at least one head pose parameter using a head pose prediction algorithm, the head pose parameter(s) comprising one or more of a head position, pitch, yaw, or roll; and to input the at least one head pose parameter along with at least one image of a user's eye, generated from a 2D image captured using an image sensor associated with the eye tracking system, into a neural network configured to generate 3D gaze information based on the at least one head pose parameter and the at least one eye image.

15 Claims, 11 Drawing Sheets

US 11,301,677 B2

DEEP LEARNING FOR THREE DIMENSIONAL (3D) GAZE PREDICTION

CROSS REFERENCE TO RELATED APPLICATIONS

This application claims priority to Swedish Application No. 1950723-5, filed Jun. 14, 2019; the content of which are hereby incorporated by reference.

TECHNICAL FIELD

The present application relates to gaze detection systems and methods. In an example, such systems and methods rely on deep learning systems, such as neural networks, to detect three dimensional (3D) gaze.

BACKGROUND

Interaction with computing devices is a fundamental action in today's world. Computing devices, such as personal computers, tablets, smartphones, are found throughout daily life. In addition, computing devices that are wearable, such as wearable headset devices (e.g., virtual reality headsets, augmented reality headsets, mixed reality headsets and other extended reality headsets) are becoming more popular. The systems and methods for interacting with such devices define how they are used and what they are used for.

Advances in eye tracking technology have made it possible to interact with a computing device using a person's gaze information, in other words the location on a display the user is gazing at. This information can be used for interaction solely, or in combination with a contact-based interaction technique (e.g., using a user input device, such as a keyboard, a mouse, a touch screen, or another input/output interface).

Previously proposed interaction techniques using gaze information can be found in U.S. Pat. No. 6,204,828, U.S. Patent Application Publication 20130169560, U.S. Pat. No. 7,113,170, U.S. Patent Application Publication 20140247232, and U.S. Pat. No. 9,619,020. The full specification of these patents and applications are herein incorporated by reference.

Generally, gaze-based interaction techniques rely on detecting a gaze of a user on a gaze point. Existing systems and methods can accurately detect two dimensional (2D) gaze. Recently, neural networks have been implemented to detect such 2D gazes.

Attempts have been made to expand existing techniques that rely on neural network to three dimensional (3D) gaze. However, the accuracy of the prediction is not as good as the one for 2D gaze. Absent accurate 3D gaze tracking, support of stereoscopic displays and 3D applications is significantly limited. Further, even in the 2D domain, a neural network is typically trained for a specific camera and screen configuration (e.g., image resolution, focal length, distance to a screen of a computing device, a size of the screen, and the like). Thus, anytime the configuration changes (e.g., different mage resolution, different screen size, and the like), the neural network can no longer predict 2D gaze at an acceptable accuracy. Re-training of the neural network for the new configuration would be needed.

There is a need to provide solutions to one or more of the identified problems.

SUMMARY

Methods, systems and computer-readable storage media having the features defined in the independent claims are provided for solving or at least ameliorating one or more of the identified problems. Preferable embodiments are defined in the dependent claims.

Specifically, embodiments presented herein aim at achieving an optimized visual experience for the user, and to enable the best possible prerequisites for the performance of eye tracking or gaze tracking, by providing three-dimensional (3D) gaze detection based on a deep learning system.

These aims are achieved by providing solutions for detecting three dimensional, 3D, gaze, using an eye tracking system.

In a first aspect, there are provided embodiments of a computer implemented method for detecting three dimensional, 3D, gaze, using an eye tracking system. The computer implemented method comprises obtaining, by a head pose prediction algorithm, at least one head pose parameter comprising one or more of a head position, pitch, yaw, or roll. The method further comprises generating, by the eye tracking system, a first eye image comprising a first eye of a user based on a first two dimensional, 2D, image. The first 2D image is generated by an image sensor associated with the eye tracking system. The method further comprises inputting, by the eye tracking system to a neural network, NN, the first eye image, wherein the NN is configured to convert the first eye image into a first feature vector, and thereafter inputting, by the eye tracking system, the obtained at least one head pose parameter and the first feature vector to a concatenation layer comprised in the NN. The concatenation layer is in turn configured to generate a resulting feature vector, by concatenating the obtained at least one head pose parameter and the first feature vector. The method is further configured to input, by the eye tracking system, the generated resulting feature vector to a fully connected, FC, module comprised in the neural network. The FC module of the neural network is configured to predict a 2D gaze origin of the first eye of the user in the first eye image, and a 2D gaze direction of the first eye of the user in the first eye image based on the resulting feature vector. Finally, the method comprises generating, by the eye tracking system, 3D gaze information for the first eye of the user based on the 2D gaze origin and the 2D gaze direction.

The neural network is usable independently of a camera and screen configuration. In other words, regardless of the specific camera, screen, and combination of camera and screen configuration, the neural network is properly trained to predict gaze information in support of 3D gaze detection. Thereby, a more robust and reliable 3D gaze generation is obtained, whereby more robust and reliable eye tracking is enabled and a high quality user experience is ensured. Further, because 3D gaze is detected, stereoscopic displays and 3D applications can be supported.

In one or more embodiments, the FC module of the neural network is configured to predict a distance correction based on the resulting feature vector, and the method further comprises generating, by the eye tracking system, a corrected distance between the first eye of the user and the image sensor by at least updating an estimated distance based on the distance correction. In these embodiments, generating 3D gaze information for the first eye of the user is further based on the corrected distance. Suitably, this further improves the accuracy of the generated 3D gaze information, whereby possibly even more robust and reliable eye tracking is enabled and even higher quality user experience is achieved.

In some embodiments, the method comprises determining, by the eye tracking system, the estimated distance between the image sensor and the first eye of the user based on the 2D image and estimating, by the eye tracking system, a position of the first eye of the user in a 3D space based on the corrected distance and on a position of the image sensor in the 3D space, wherein the 3D gaze information comprises the position of the first eye of the user in the 3D space. Suitably, this further improves the accuracy of the generated 3D gaze information, further ensuring robust and reliable eye tracking and a high quality user experience.

In one or more embodiments, the method comprises estimating, by the eye tracking system, a 3D gaze direction from the position of the first eye of the user in the 3D space based on the 2D gaze origin and the 2D gaze direction, wherein the 3D gaze information comprises the 3D gaze direction. Suitably, this further improves the accuracy of the generated 3D gaze information, further ensuring robust and reliable eye tracking and a high quality user experience.

Generating the first eye image may comprise normalizing the first 2D image, to generate a normalized image, and cropping the normalized image around the first eye of the user. This further contributes to the neural network's predictions not being depend on the camera and screen configuration, since because the eye images are on the same format, the same trained neural network can more efficiently be used across different eye tracking systems including ones integrated with different types of smartphones, tablets, laptops, wearable headset devices/head mounted devices (e.g., VR, AR, MR or other XR headsets), and standalone eye tracking systems.

In one or more embodiment, the first 2D image further shows a second eye of the user and the method further comprises: generating, by the eye tracking system, a second eye image comprising the second eye of the user, based on the first 2D image; inputting, by the eye tracking system to the fully connected module comprised in the neural network, the second eye image, wherein the fully connected module of the neural network is further configured to convert the second eye image into a second feature vector, and inputting, by the eye tracking system to a concatenation layer comprised in the NN, also the second feature vector, wherein the concatenation layer is configured to generate the resulting feature vector, by concatenating the obtained at least one head pose parameter, the first feature vector and the second feature vector. The method according to these embodiments may further comprise generating, by the eye tracking system, a second position of the second eye of the user in the 3D space and a second gaze direction from the second position in the 3D space based on the corrected distance, and wherein the 3D gaze information comprises the second position and the second gaze direction.

The second eye image may be a mirrored image around the second eye of the user. That way, the first and second eye images are more similar and it is even easier for the neural network to process them in an efficient manner.

All advantages described above for the method processing the first user eye image are also equally applicable to both eyes, i.e. processing the first and the second user eye image.

In some embodiments, the first eye image and the second eye image are generated at a first image resolution, based on a first predefined distance associated with projecting the first eye image and the second eye image in a 3D gaze space.

The neural network is in some embodiments configured to predict a second 2D gaze origin and a second 2D gaze direction of the second eye of the user in the second eye image based on the first eye image and the second eye image. In other embodiments, the neural network may be configured to predict a second 2D gaze origin and a second 2D gaze direction of the second eye in the second eye image based on the second eye image and independently of the first eye image.

According to a second aspect, there is provided an eye tracking system for detecting three dimensional, 3D, gaze. The system comprises an image sensor, a processor and a memory. The memory stores computer-readable instructions that, upon execution by the processor, cause the eye tracking system to perform operations comprising: obtaining, by a head pose prediction algorithm, at least one head pose parameter, the at least one head pose parameter comprising one or more of: a head position, pitch, yaw, or roll; generating, by the eye tracking system, a first eye image comprising a first eye of a user based on a first two dimensional, 2D, image, wherein the 2D image is generated by the image sensor; inputting, by the eye tracking system to a neural network, NN, the first eye image, wherein the NN is configured to convert the first eye image into a first feature vector; inputting, by the eye tracking system to a concatenation layer comprised in the NN, the obtained at least one head pose parameter and the first feature vector, wherein the concatenation layer is configured to generate a resulting feature vector, by concatenating the obtained at least one head pose parameter and the first feature vector; inputting, by the eye tracking system to a fully connected, FC, module comprised in the neural network, the generated resulting feature vector, wherein the FC module of the neural network is configured to predict a 2D gaze origin of the first eye of the user in the first eye image, and a 2D gaze direction of the first eye of the user in the first eye image based on the resulting feature vector; and generating, by the eye tracking system, 3D gaze information for the first eye of the user based on the 2D gaze origin and the 2D gaze direction.

The FC module of the neural network may further be configured to predict a distance correction based on the resulting feature vector and the memory may further be configured to store computer-readable instructions that, upon execution by the processor, cause the eye tracking system to perform operations comprising: generating, by the eye tracking system, a corrected distance between the first eye of the user and the image sensor by at least updating an estimated distance based on the distance correction, wherein generating, by the eye tracking system, 3D gaze information for the first eye of the user is further based on the corrected distance.

In some embodiments, the neural network is hosted on a remote system, wherein inputting the first eye image comprises transmitting the first eye image to the remote system over a data network, and wherein the operations further comprise receiving the distance correction, the 2D gaze origin, and the 2D gaze direction from the remote system over the data network.

According to a third aspect, there is provided a non-transitory computer-readable storage medium comprising instructions that, upon execution on a computer system, configure the computer system to perform operations comprising: obtaining, by a head pose prediction algorithm, at least one head pose parameter, the at least one head pose parameter comprising one or more of: a head position, pitch, yaw, or roll; generating, by an eye tracking system, a first eye image comprising a first eye of a user based on a first two dimensional, 2D, image, wherein the 2D image is generated by the image sensor; inputting, by the eye tracking system to a neural network, NN, the first eye image, wherein the NN is configured to convert the first eye image into a first feature vector; inputting, by the eye tracking system to a concatenation layer comprised in the NN, the obtained at least one head pose parameter and the first feature vector, wherein the concatenation layer is configured to generate a resulting feature vector, by concatenating the obtained at least one head pose parameter and the first feature vector; inputting, by the eye tracking system to a fully connected, FC, module comprised in the neural network, the generated resulting feature vector, wherein the FC module of the neural network is configured to predict a 2D gaze origin of the first eye of the user in the first eye image, and a 2D gaze direction of the first eye of the user in the first eye image based on the resulting feature vector; and generating, by the eye tracking system, 3D gaze information for the first eye of the user based on the 2D gaze origin and the 2D gaze direction.

The effects and/or advantages presented in the present disclosure for embodiments of the method according to the first aspect may also apply to corresponding embodiments of the non-transitory computer-readable storage medium according to the third aspect.

It is noted that embodiments of the present disclosure relate to all possible combinations of features recited in the claims.

BRIEF DESCRIPTION OF THE DRAWINGS

In the following, example embodiments will be described in greater detail with reference to the accompanying drawings, in which.

Figure 1:
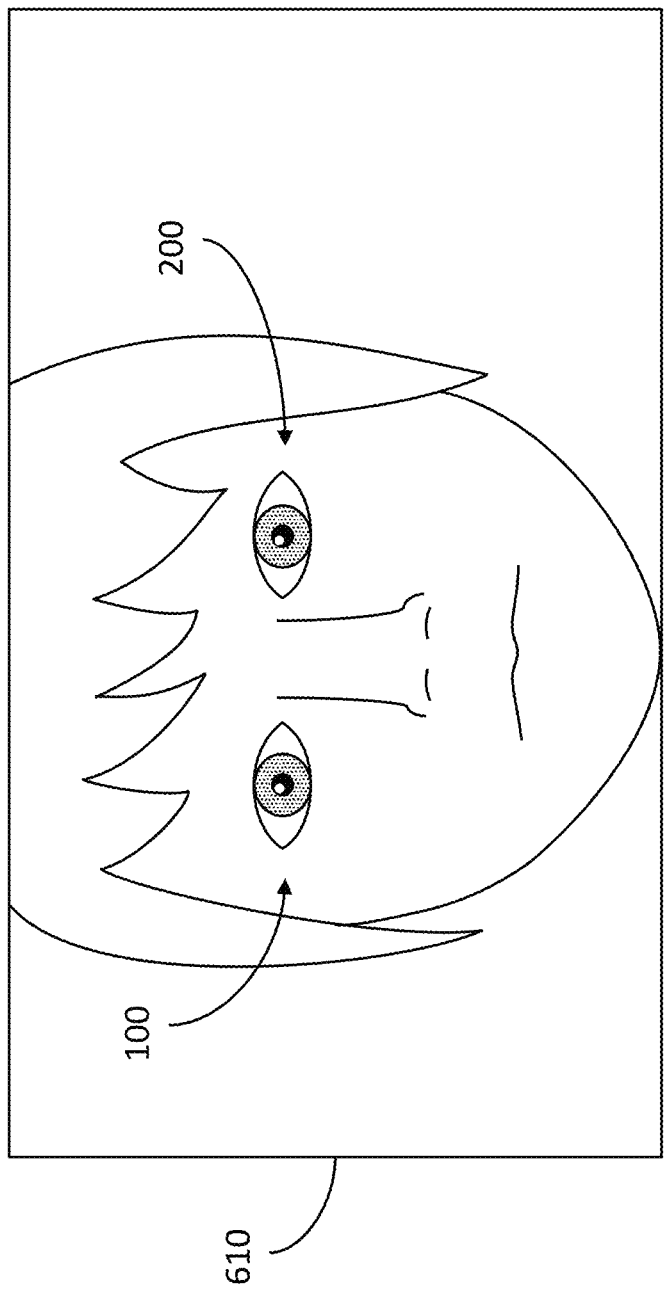
FIG. 1 shows an example of an image of at least part of a face captured by an image sensor, according to an embodiment.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Introduction

In some embodiments, the head mounted device may be configured for extended reality (XR) applications. Hereinafter, when the term XR is used, this is to be interpreted as including a selection of at least the techniques referred to as VR, AR and MR. Eye tracking and gaze tracking solutions are today more and more commonly being used in head-mounted devices for virtual reality (VR), augmented reality (AR), mixed reality (MR) or other extended reality (XR) experiences.

The term eye tracking as used herein may be understood as comprising: tracking or observing actual parts of an eye, in the real world, in a 3D model of the eye, in a 2D image depicting the eye; or determining what the eye is tracking or gazing towards. Determination of what the eye is tracking or gazing towards may also be referred to as gaze tracking. The term eye tracking, if only this term is used, may therefore be understood to include gaze tracking.

Images of an eye of the user may be captured using any type of imaging sensor/image sensor, imaging device, camera or the like comprised in an eye tracking or gaze tracking system. Hereinafter, the terms image sensor and camera will be used, but it is to be understood that within the context of the present disclosure both terms may refer to any type of imaging sensor, imaging device or the like configured to generate an image based on infalling light. In one or more embodiments, the eye tracking or gaze tracking system is comprised in a head mounted device.

Any embodiment described herein as referring to one eye, for instance a first eye, of a user is of course equally applicable to the any of the user's eyes, and may also be performed for both the eyes of a user in parallel, or consecutively.

Throughout the present disclosure, the term obtaining information may be understood as receiving information, in a push fashion, and/or retrieving information, in a pull fashion.

Embodiments of the present disclosure relate to three dimensional (3D) gaze detection based on a deep learning system. In an example, a neural network is used. This neural network is usable independently of a camera and screen configuration. In other words, regardless of the specific camera, screen, and combination of camera and screen configuration, the neural network is properly trained to predict gaze information in support of 3D gaze detection.

More particularly, a camera associated with an eye tracking system captures a two dimensional (2D) image of a user gazing at a point in 3D space. A rough distance $d_{rough}$ between the camera and one or both of the user's eyes is estimated according to any of the embodiments presented herein. The 2D image is optionally normalized and centered around the user's eye at a high resolution. A normalized image around the user's face may further optionally be generated, preferably at a low resolution. The eye image and, optionally, the face image, are input to the neural network that, in turn, predicts a 2D gaze vector per eye and optionally also a distance correction c for the rough distance $d_{rough}$. A position of eye in 3D space is estimated based on rough distance $d_{rough}$ and optionally also on the distance correction c, and a position of the camera in the 3D space. Based on a mapping function between the 2D space and the 3D space, each 2D gaze vector is mapped to a 3D gaze direction. The 3D position of an eye and its 3D gaze direction indicate the 3D gaze associated with that eye.

In the case where a normalized 2D image is used and because the neural network predicts a distance correction c and 2D gaze vectors, the neural network's predictions do not depend on the camera and screen configuration. Hence, that same trained neural network can be used across different eye tracking systems including ones integrated with different types of smartphones, tablets, laptops, wearable headset devices/head mounted devices (e.g., VR, AR, MR or other XR headsets), and standalone eye tracking systems. Further, because 3D gaze is detected, stereoscopic displays and 3D applications can be supported.

The training of the neural network generally relies on training images that are diverse with respect to the locations of gaze points relative to 2D planes of cameras used to capture the training images (e.g., for each camera, an X, Y plane perpendicular to the camera's line-of-sight). In particular, some of the training images show user eyes that gazed at gaze points located in the 2D planes of the cameras, while other training images show user eyes that gazed at gaze points outside of the 2D planes. During the training, the neural network looks for gaze angles between user eyes-cameras and user-gaze points and eye-to-camera distances. Because diversity is used, the neural network can correctly find the angles and the distances. Gaze lines (also referred to as gaze rays) are predicted from the gaze angles and distances between the gaze points and the gaze lines (gaze point-to-gaze line distances) are computed. The loss function of the neural network involves gaze point-to-gaze line distances. During the training, the parameters of the neural network (e.g., weights of connection between nodes at the different layers) are updated to minimize the loss function by minimizing the difference between the true and predicted gaze point-to-gaze line distances. In the interest of brevity, from herein forward, an image refers to a 2D image, unless otherwise indicated.

These and other features of training and using the neural network for 3D gaze prediction independently of a camera and screen configuration are further described herein below. Various components and configurations of eye tracking systems are described herein next to provide a better understanding of the 3D gaze prediction techniques.

The inventors have realized that by providing 2D image data in combination with head pose parameters, such as head position, yaw, pitch and/or roll, into the fully connected layer of a neural network configured to predict 2D gaze information and optionally a distance correction c, a highly accurate result is obtained.

Although head pose parameters are exemplified herein as comprising one or more of head position, yaw, pitch and roll, it is evident to a person skilled in the art that other parameterizations may be used without diverting from the scope of the invention. For example, instead of parameterizing the directions of a coordinate system into parameters such as position, yaw, pitch and roll, e.g. quaternions or orthonormal rotation matrices, or any other suitable representation, may be used. It is further known that the different parametric representations may be derived from one another in manners known in the art.

Figure 7A:
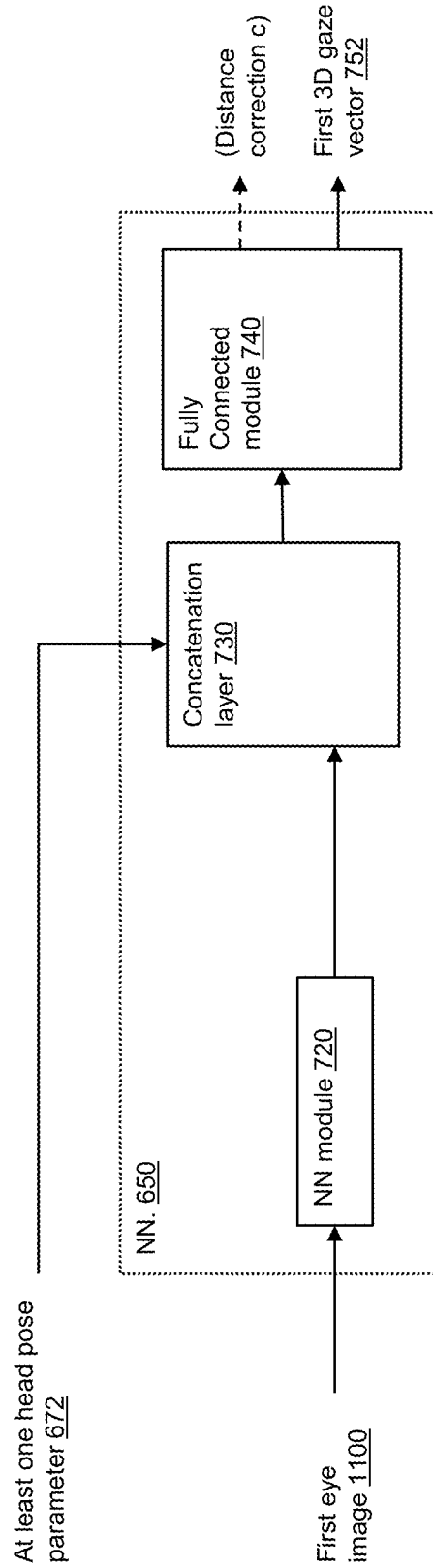
FIG. 7a illustrates an example network architecture for a neural network, according to an embodiment.
Figure 7B:
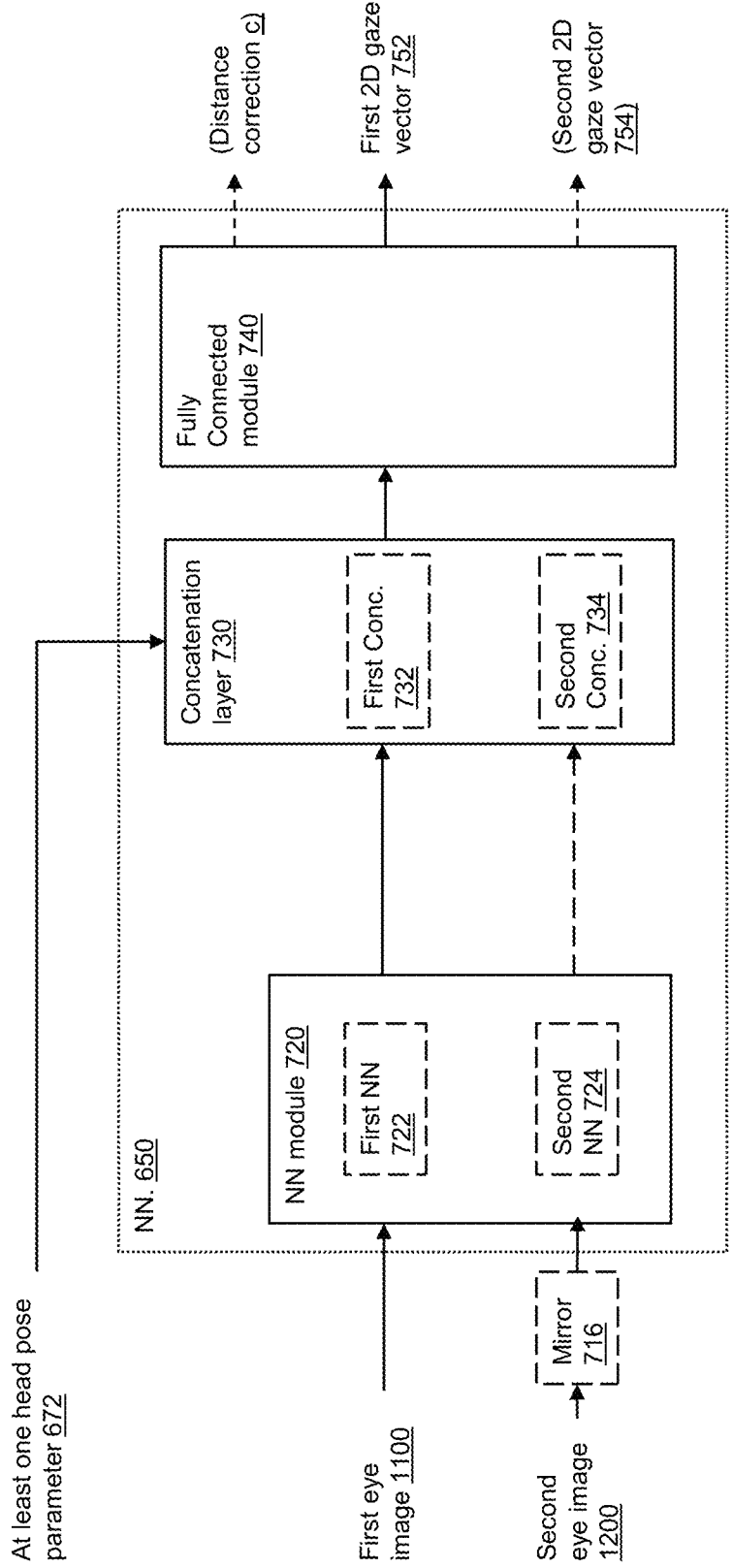
FIG. 7b illustrates an example network architecture for a neural network, according to an embodiment.

Furthermore, since the head pose parameters are represented as vectors of numerical values, they are already in a format that is acceptable as input by the fully connected layer. Thereby, there is no need for an additional neural network to process image data (e.g. a face image) to obtain the head pose parameters needed for accurate prediction of 2D gaze parameters and the distance correction c. Hence, the computational power, system complexity and cost needed to perform the predictions with maintained or improved quality are reduced. FIGS. 7a and 7b illustrate example network architectures for a neural network taking a first eye image and at least one head pose parameter, and in the case of FIG. 7b additionally a second eye image, as input and outputting 2D gaze information and a distance correction.

Figure 7C:
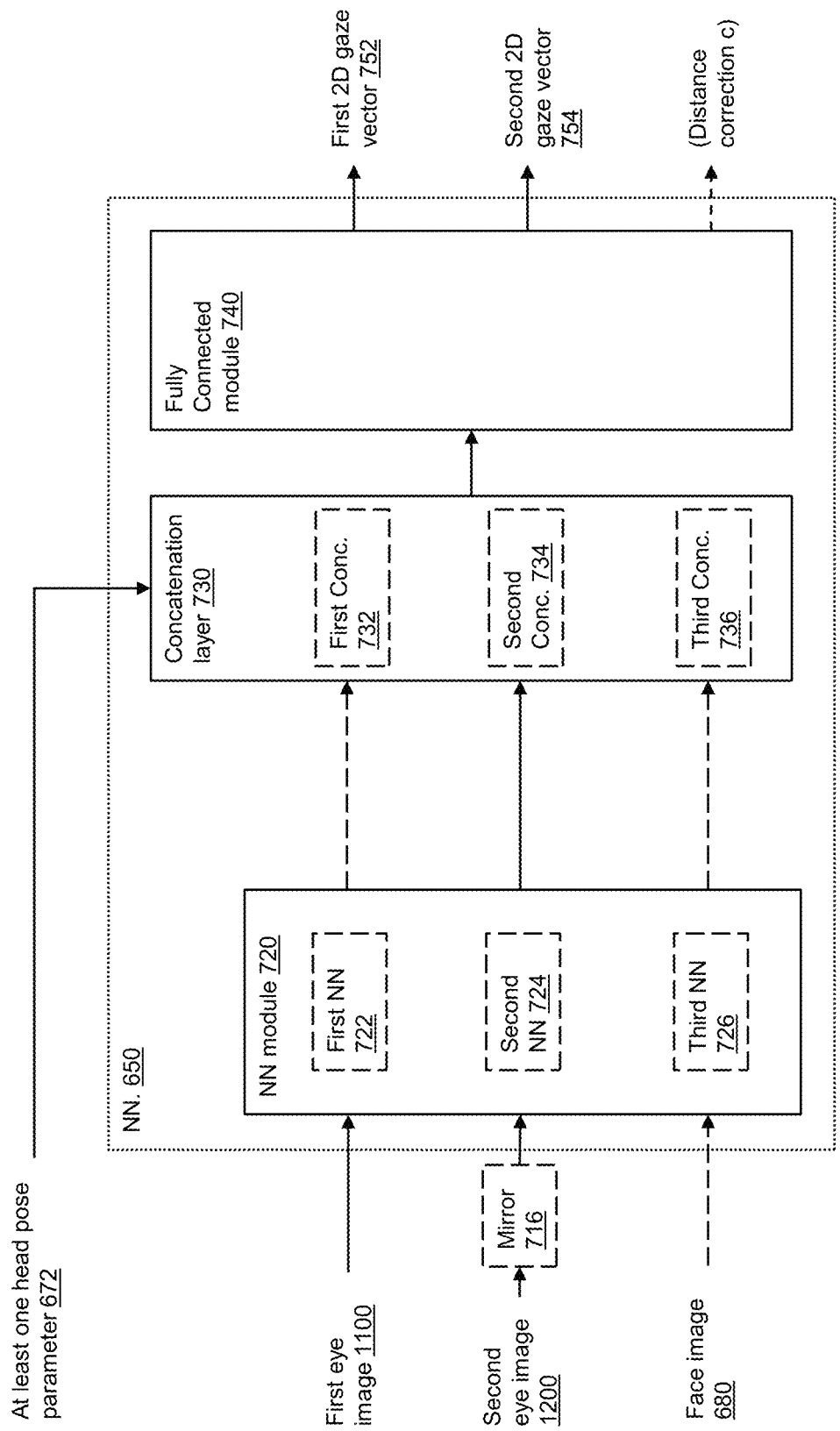
FIG. 7c illustrates an example network architecture for a neural network, according to an embodiment.

Of course, it is also possible to combine the methods of directly inputting head pose parameters into the fully connected layer with the use of a face image being processed by a neural network, if the aim is instead to obtain the highest possible accuracy of the resulting 2D gaze and distance correction predictions by the system, and reduction of computational load is secondary. Such example network architecture for a neural network is illustrated in FIG. 7c. In this case, inputting head pose parameters into the fully connected layer provides a significant improvement of the prediction result compared to only using the data obtained from a face image being processed by a neural network. Furthermore, during the training, the neural network may learn "n" calibration parameters for the persons shown in the training images. A designer of the neural network needs only to specify the number "n" rather than actually specifying the calibration parameters. These parameters are input to layers of the neural network and become a part of the training. Upon completion of the training, an end user operating a tracking system typically follows a calibration process. Part of this process, calibration images (e.g., where the end user is asked to gaze at particular points) are input to the neural network that then generates the "n" calibration parameters for the user. These parameters are used in the gaze prediction for the end user.

System Architecture

Figure 3A:
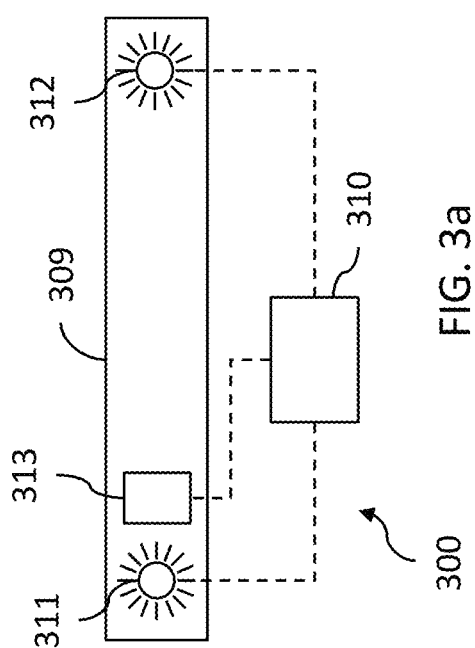
FIG. 3a shows an eye tracking system 300 according to one or more embodiments.

FIG. 3a shows an eye tracking system 300 (which may also be referred to as a gaze tracking system), according to an embodiment. The system 300 comprises illuminators 311 and 312 for illuminating the eyes of a user, and an image sensor 313 for capturing images of the eyes of the user. The illuminators 311 and 312 may, e.g., be light emitting diodes emitting light in the infrared frequency band, or in the near infrared frequency band. The image sensor 313 may for example be a camera, such as a complementary metal oxide semiconductor (CMOS) camera or a charged coupled device (CCD) camera. The camera is not limited to be an IR camera or a depth camera or a light-field camera. The shutter mechanism of the image sensor can either be a rolling shutter or a global shutter.

A first illuminator 311 is arranged coaxially with (or close to) the image sensor 313 so that the image sensor 313 may capture bright pupil images of the user's eyes. Due to the coaxial arrangement of the first illuminator 311 and the image sensor 313, light reflected from the retina of an eye returns back out through the pupil towards the image sensor 313, so that the pupil appears brighter than the iris surrounding it in images where the first illuminator 311 illuminates the eye. A second illuminator 312 is arranged non-coaxially with (or further away from) the image sensor 313 for capturing dark pupil images. Due to the non-coaxial arrangement of the second illuminator 312 and the image sensor 313, light reflected from the retina of an eye does not reach the image sensor 313 and the pupil appears darker than the iris surrounding it in images where the second illuminator 312 illuminates the eye. The illuminators 311 and 312 may for example, take turns to illuminate the eye, so that every first image is a bright pupil image, and every second image is a dark pupil image.

The eye tracking system 300 also comprises circuitry, for example including one or more processors 310, for processing the images captured by the image sensor 313. The circuitry or processor(s) 310 may for example be application-specific integrated circuits (ASIC) configured to perform a specific eye tracking and position determination method. Alternatively, the processor(s) may be configured to execute instructions (for example in the form of a computer program) stored in one or more memories 340. Such a memory or storage device 340 may for example be comprised in the system 300, or may be external to (for example located remotely from) the system 300.

In one or more embodiments, the eye tracking system 300 for detecting three dimensional, 3D, gaze, comprises circuitry or a processor 310, and a memory 340 storing computer-readable instructions that, upon execution by the processor, cause the eye tracking system to perform a number of operations. The operations comprise: obtaining, by a head pose prediction algorithm, at least one head pose parameter 672, the at least one head pose parameter 672 comprising one or more of: a head position, pitch, yaw, or roll; generating, by the eye tracking system 300, a first eye image 1100 comprising a first eye 100 of a user 510 based on a first two dimensional, 2D, image 610, wherein the 2D image 610 is generated by an image sensor 420, for example a camera 420; inputting, by the eye tracking system 300 to a neural network, NN 650 the first eye image 1100, wherein the NN 650 is configured to convert the first eye image 1100 into a first feature vector $FV_1$; inputting, by the eye tracking system 300 to a concatenation layer 730 comprised in the NN 650, the obtained at least one head pose parameter 672 and the first feature vector $FV_1$, wherein the concatenation layer 730 is configured to generate a resulting feature vector $FV_{RESULT}$, by concatenating the obtained at least one head pose parameter 672 and the first feature vector $FV_1$; inputting, by the eye tracking system 300 to a fully connected, FC, module 740 comprised in the neural network 650, the generated resulting feature vector $FV_{RESULT}$, wherein the FC module 740 of the neural network 650 is configured to predict a 2D gaze origin of the first eye 100 of the user 510 in the first eye image 1100, and a 2D gaze direction of the first eye 100 of the user 510 in the first eye image 1100 based on the resulting feature vector $FV_{RESULT}$; and generating, by the eye tracking system, 3D gaze information for the first eye 100 of the user 510 based on the 2D gaze origin and the 2D gaze direction.

The FC module 740 of the neural network 650 may further be configured to predict a distance correction c based on the resulting feature vector $FV_{RESULT}$. The memory 340 may further be configured to store computer-readable instructions that, upon execution by the processor, cause the eye tracking system to perform operations comprising: generating, by the eye tracking system, a corrected distance between the first eye 100 of the user 510 and the camera 420 by at least updating an estimated distance based on the distance correction c; wherein generating, by the eye tracking system, 3D gaze information for the first eye 100 of the user is further based on the corrected distance.

Figure 8:
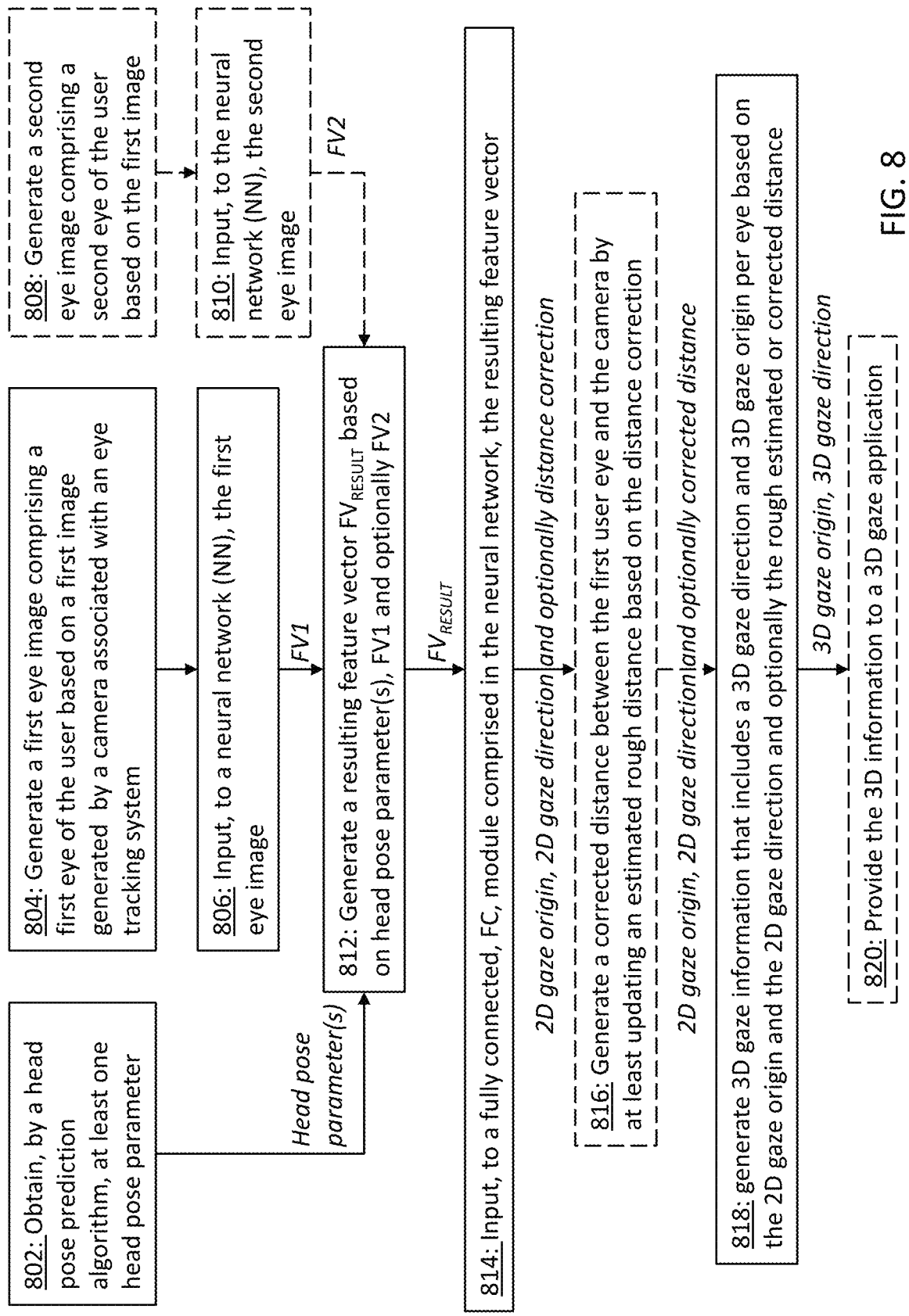
FIG. 8 is a flow chart illustrating a method for predicting 3D gaze based on a deep learning system, according to an embodiment.

The circuitry may further be configured to, or the memory 340 may be configured to store instructions for causing the system 300 to, perform a method according to any of the embodiments presented in connection with FIG. 8.

The circuitry 310 may for example, be connected to the image sensor 313, 420 and the illuminators 311 and 312 via a wired or a wireless connection. In another example, circuitry in the form of one or more processors may be provided in one or more stacked layers below the light sensitive surface of the image sensor 313.

Figure 2C:
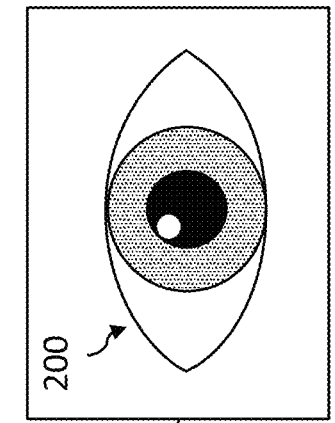
FIGS. 2b and 2c, respectively, shows an example of an image of an eye generated based on the image of FIG. 1.
Figure 2B:
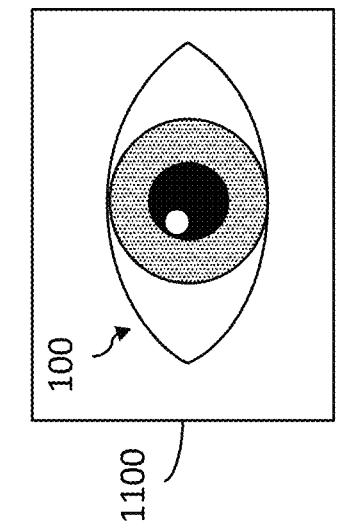
Figure 2A:
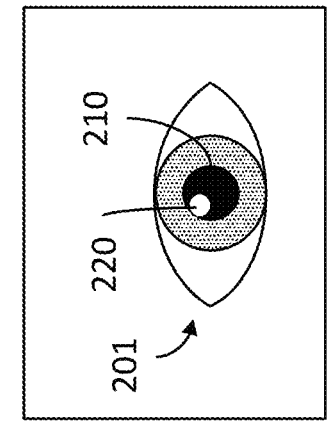
FIG. 2a shows an example of an image of an eye.

FIG. 2a shows an example of an image of an eye 201, captured by the image sensor 313, 420. The eye 201 may for example be a first eye 100 or a second eye 200 of a user 510. The circuitry 310 may for example, employ image processing (such as digital image processing) for extracting features in the image. The circuitry 310 may for example employ pupil center cornea reflection (PCCR) eye tracking to determine where the eye 201 is looking. In PCCR eye tracking, the processor 310 estimates the position of the center of the pupil 210 and the position of the center of a glint 220 at the eye 200. The glint 220 is caused by reflection of light from one of the illuminators 311 and 312. The processor 310 calculates where the user is in space using the glint 220 and where the user's eye 201 is pointing using the pupil 210. Since there is typically an offset between the optical center of the eye 201 and the fovea, the processor 310 performs calibration of the fovea offset to be able to determine where the user is looking. The gaze directions obtained from the left eye and from the right eye may then be combined to form a combined estimated gaze direction (or viewing direction). As will be described below, many different factors may affect how the gaze directions for the left and right eyes should be weighted relative to each other when forming this combination.

FIG. 2b shows an example of a first eye image 1100, showing the first eye 100 of a user 510, generated based on the image of FIG. 1.

FIG. 2c shows an example of a second eye image 1200, showing the second eye 200 of a user 510, generated based on the image of FIG. 1. In the embodiment described with reference to FIG. 3a, the illuminators 311 and 312 are arranged in an eye tracking module 309 placed below a display watched by the user. This arrangement serves only as an example. It will be appreciated that more or less any number of illuminators and image sensors may be employed for eye tracking, and that such illuminators and image sensors may be distributed in many different ways relative to displays watched by the user. It will be appreciated that the eye tracking scheme described in the present disclosure may, for example, be employed for remote eye tracking (for example in a personal computer, a smart phone, or integrated in a vehicle) or for wearable eye tracking (such as in VR glasses, AR glasses, MR glasses or any type of head mounted device for XR applications, including VR, AR and/or MR applications).

Figure 3B:
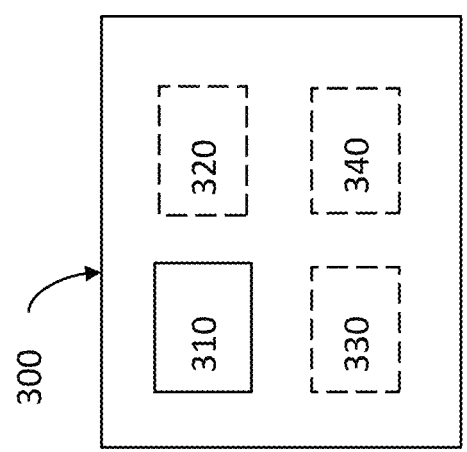
FIG. 3b is a schematic overview of an eye tracking system 300 according to one or more embodiments.

FIG. 3b is a schematic overview of an eye tracking system 300 according to one or more embodiments, wherein the eye tracking system 300 comprises at least one processor 310 configured to perform the eye tracking processing of embodiments presented herein. The eye tracking system 300 as shown in FIG. 3b further optionally comprises, or is communicatively connected to, one or more input devices 320 (e.g., a mouse, a keyboard, eye tracking device, etc.), one or more output devices 330 (e.g., a display device, a printer, etc.), and/or one or more storage devices 340. The eye tracking system 300 of FIG. 3b may further be communicatively connected, by wired or wireless means, to eye tracking equipment, including illuminators 311 and 312 for illuminating the eyes of a user, and an image sensor 313 for capturing images of the eyes of the user.

Figure 3C:
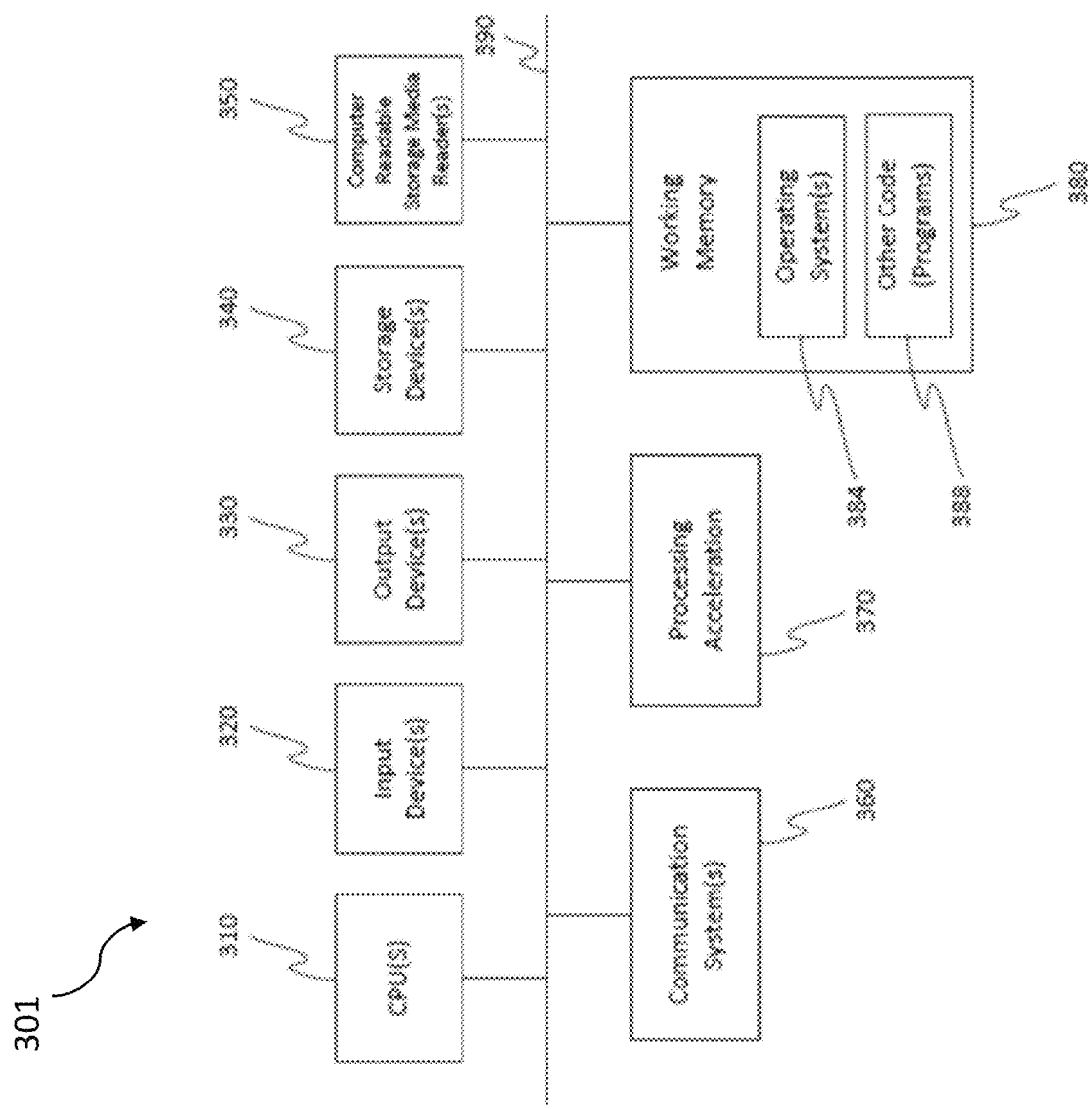
FIG. 3c is a block diagram illustrating a specialized computer system, according to an embodiment.

FIG. 3c is a block diagram illustrating a specialized computer system 301 in which embodiments of the present disclosure may be implemented. This example illustrates a specialized computer system 301 such as may be used, in whole, in part, or with various modifications, to provide the functions of components described herein.

Specialized computer system 301 is shown comprising hardware elements that may be electrically coupled via a bus 390. The hardware elements may include one or more central processing units, or processors, 310, one or more input devices 320 (e.g., a mouse, a keyboard, eye tracking device, etc.), and one or more output devices 330 (e.g., a display device, a printer, etc.). Specialized computer system 301 may also include one or more storage devices 340. By way of example, storage device(s) 340 may be disk drives, optical storage devices, solid-state storage devices such as a random access memory ("RAM") and/or a read-only memory ("ROM"), which can be programmable, flash-updateable and/or the like.

Specialized computer system 301 may additionally include a computer-readable storage media reader 350, a communications system 360 (e.g., a modem, a network card (wireless or wired), an infra-red communication device, Bluetooth™ device, cellular communication device, etc.), and working memory 380, which may include RAM and ROM devices as described above. In some embodiments, specialized computer system 301 may also include a processing acceleration unit 370, which can include a digital signal processor, a special-purpose processor and/or the like.

Eye tracking performed by systems such as the system 300 in FIG. 3a or 3b, or the system 301 in FIG. 3c, typically employ an eye model. This eye model is calibrated to properties of the individual user's eye or eyes, in manners known in the art.

Figure 4:
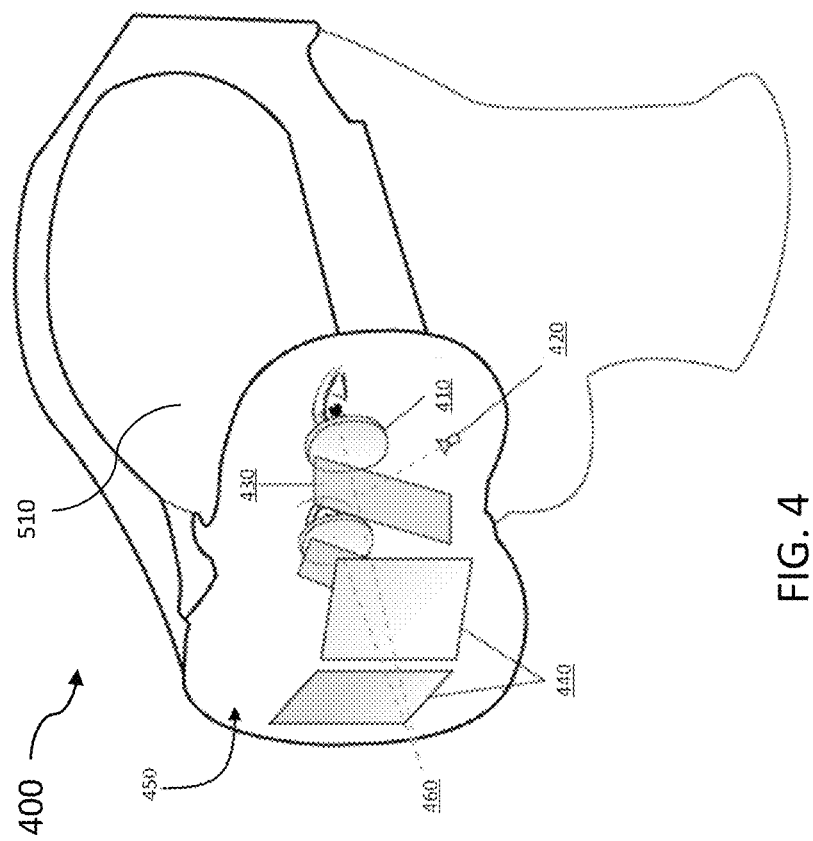
FIG. 4 shows an example of a wearable computing device that implements components of an eye tracking system, according to an embodiment.

FIG. 4 shows an example of a wearable computing device, in this case a head mounted computing device, 400 that implements some or all of the above components of an eye tracking system as described in connection with FIGS. 3a, 3b, 3c and FIG. 4. The wearable computing device 400 can be a VR headset, an AR headset, an MR headset or any other XR headset that can be worn by a user 510. As illustrated, the wearable computing device 400, a camera 420 or a set of cameras 420, and a display 440 or a set of displays 440. Optionally, the wearable computing device 400 further comprises a set of lenses 410, such as Fresnel lenses, and/or a set of hot mirrors 430. As an alternative to hot mirrors, the wearable computing device may comprise one or more diffractive optical elements, DOEs, arranged in front of the eye(s) of the user wherein said one or more DOEs are arranged to direct a portion of incident light reflected from the eye(s) of the user towards the camera (not shown in the figures). The camera 420 can include the image sensors 313 of FIG. 3a. Although not shown in FIG. 4, the wearable computing device 400 can also include a set of illuminators and processing circuitry. These and other components can be integrated within a housing 450 of the wearable computing device 400. In this way, upon the user mounting the wearable computing device 400 on his or her head, the set of lenses 410 would be relatively close to the user's eyes and the set of displays would be relatively far from the user's eye, and the remaining components may be located in between. The arrangement of these components allows the detection of the user's gaze point in three dimensional virtual or real space.

Herein next, the use of a deep learning system for 3D gaze prediction is described. In the interest of clarity of explanation, this system is described in connection with a camera, a screen, and two user eyes (e.g., the camera captures images, some or all of which show the two user eyes). The deep learning system can be used with an arbitrary camera and screen configuration for eye tracking that uses visible light, passive infrared, active bright-pupil (BP) infrared, and the like. However, the embodiments of the present disclosure are not limited as such.

For example, the embodiments similarly apply to an eye tracking system that uses one camera per user eye, such as in the context of a VR, AR or MR headset. Changes to how the deep learning system is implemented for a one camera per eye tracking should be apparent to one skilled in the art in light of the present disclosure. For example, rather than inputting a first and a second eye image, each focusing on one of the user eyes, only a single, first, eye image of the user eye that is associated with the camera is used.

During the training, the neural network may learn to predict a distance correction c from an input 2D image rather than predicting this correction based on the first and second eye images comprising a respective one of the user eyes. This system would then output a 2D gaze vector for the user eye associated with the camera and, optionally, a distance correction c for the rough camera-to-eye distance. In addition, in the case of a VR, AR or MR device, a rough distance $d_{rough}$ may be predefined and need not be estimated based on an image generated by the camera.

Figure 5:
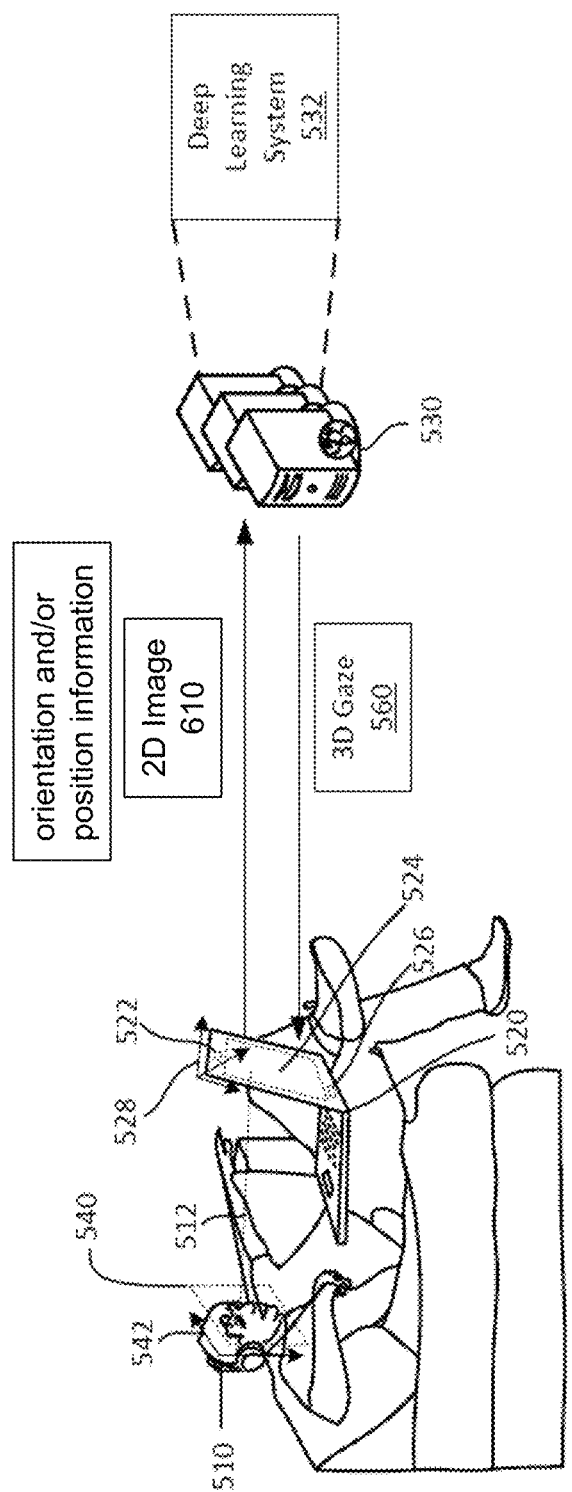
FIG. 5 illustrates an example computing environment for predicting 3D gaze based on a deep learning system, according to an embodiment.

FIG. 5 illustrates an example computing environment for predicting 3D gaze based on a deep learning system, according to an embodiment. Generally, 2D gaze information refers to an X, Y gaze position on a 2D plane. In comparison, 3D refers to not only the X, Y gaze position, but also the Z gaze position. In an example, the 3D gaze can be characterized by an eye position in 3D space as the origin and a direction of the 3D gaze from the origin.

As illustrated in FIG. 5, a user 510 operates a computing device 520 that tracks the 3D gaze 512 of the user 510. To do so, the computing device 520 is, in an example, in communication with a server computer 530 that hosts a deep learning system 532. The computing device 520 sends, to the server computer 530 over a data network (not shown), a 2D image 550 showing the user eyes while the user 510 is gazing. The server computer 530 inputs this 2D image 550 to the deep learning system 532 that, in response, predicts the 3D gaze 512. In order for the deep learning system 532 to predict the 3D gaze 512 according to embodiments presented herein, information on the position and/or orientation of the user's 510 head is further input into the deep learning system 532. The input position and/or orientation data may, in the case the deep learning system 532 comprises a head pose parameter estimator 760, comprise information relating to a 2D face image, sensor data relating to the location of reflectors located on the head of the user, depth image sensor data, or IMU data, as described further in connection with FIG. 6. If the head pose parameter estimator 670 is external to the deep learning system 532, the head pose parameter estimator may be configured to input position and/or orientation data into the deep learning system 532, i.e. into the neural network 650, in the form of at least one head pose parameter 672. The server computer 530 sends information 560 about the 3D gaze 512, such as the 3D eye position and 3D gaze direction back to the computing device 520 over the data network. The computing device 520 uses this information 560 to provide a 3D gaze-based computing service to the user 510.

Although FIG. 5 shows the computer server 530 hosting the deep learning system 532, the embodiments of the present disclosure are not limited as such. For example, the computing device 530 can download code and host an instance of the deep learning system 532. In this way, the computing device 520 relies on this instance to locally predict the 3D gaze 512 and need not send the 2D image 550 to the server computer 530. In this example, the server computer 530 (or some other computer system connected thereto over a data network) can train the deep learning system 532 and provide an interface (e.g., a web interface) for downloading the code of this deep learning system 532 to computing devices, thereby hosting instances of the deep learning system 532 on these computing devices.

In an example, the computing device 520 includes an image sensor 313, 420, 522, for example in the form of a camera 313, 420, 522, a screen 524, and a 3D gaze application 526. The camera 522 generates the 2D image 550 that is a 2D representation 540 of at least the user's eyes. This 2D image 550 shows the user eyes while gazing in 3D space. A 3D coordinate system 528 can be defined in association with the camera 522. For example, the camera 522 is at the origin of this 3D coordinate system 528. The X, Y plane can be a plane perpendicular to the camera's 522 line-of-sight. In comparison, the 2D image 550 has a 2D plane that can be defined around a 2D coordinate system 542 local to the 2D representation 540 of the user's face. The camera 522 is associated with a mapping between the 2D space and the 3D space (e.g., between the two coordinate systems 542 and 528). In an example, this mapping includes the camera's 522 back-projection matrix and is stored locally at the computing device 522 (e.g., in storage location associated with the 3D gaze application 526).

The screen 524 may, but need not be, in the X, Y plane of the camera 522 (if not, the relative positions between the two is determined based on the configuration of the computing device 520). The 3D gaze application 526 can process the 2D image 550 for inputting to the deep learning system 532 (whether remote or local to the computing device 520) and can process the information 560 about the 3D gaze to support stereoscopic displays (if also supported by the screen 524) and 3D applications (e.g., 3D controls and manipulations of displayed objects on the screen 524 based on the information 560).

Figure 6:
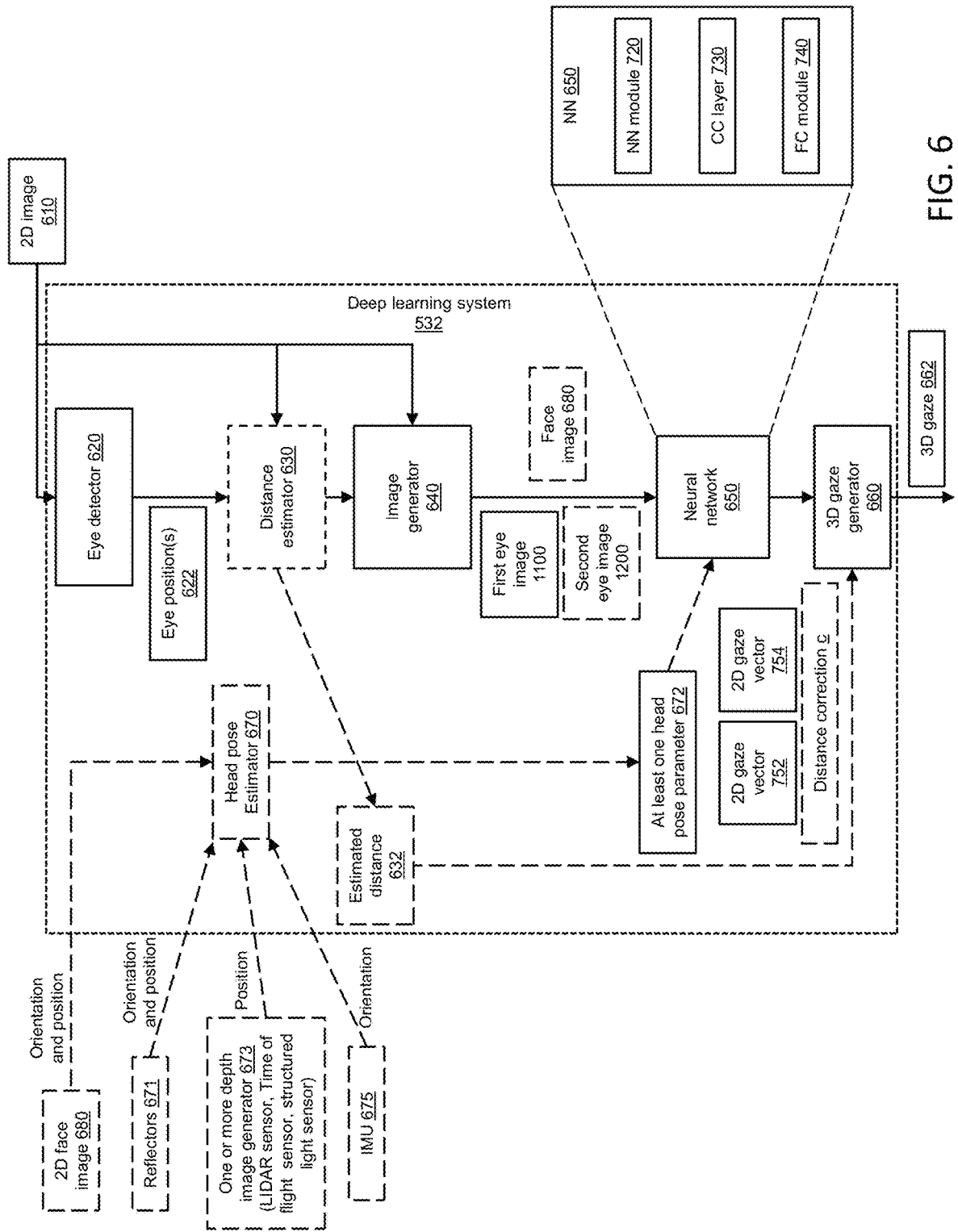
FIG. 6 illustrates example components of a deep learning system for predicting 3D gaze, according to an embodiment.

FIG. 6 illustrates example components of a deep learning system 532 for predicting 3D gaze, according to an embodiment. As illustrated, the deep learning system 532 includes an eye detector 620, an image generator 640, a neural network 650, and a 3D gaze generator 660. Some or all these components can be implemented as specialized hardware and/or as software modules (e.g., specific computer-readable instructions) hosted on specialized or general processing hardware.

As illustrated, a 2D image 610 is input to the eye detector 620. For example, this 2D image 610 is generated with a camera, such as the camera 420 of the eye tracking system 300. In response, the eye detector 620 detects one or more user eye 100, 200 in the 2D image 610 and outputs information about the respective position 622 of the one or more eye 100, 200 in the 2D image (e.g., locations of their respective center of the pupil, center of the cornea or other suitable part of the respective eye, in the 2D plane of the 2D image 610). In a non-limiting example, the eye detector 620 is implemented as a machine learning algorithm trained for eye detection. Many machine learning algorithms are possible and are known to one skilled in the art.

In one or more embodiments, the deep learning system 532 may further comprise a head pose estimator 670. In these embodiments, information relating to the orientation and/or position, in a 2D image plane or in 3D, of the head of the user 510 may be input to the head pose estimator 670. In response, the head pose estimator 670 may be configured to generate at least one head pose parameter 672, such as jaw, roll and/or pitch, based on the input orientation information and/or position information. The head pose estimator is further configured to input the at least one head pose parameter 672 into the neural network 650 for processing according to any of the embodiments presented herein. As some non-limiting examples, a 2D face image 680 or information on reflections from reflectors 671 placed on the head of the user 510 may be input to the head pose estimator 670, thereby providing information relating to the orientation and/or position of the head of the user 510. In other non-limiting examples, information relating to the orientation of the head of the user 510 may be input to the head pose estimator 670 by one or more depth image generator 673, wherein the one or more depth image generator 673 may comprise a selection of one or more LIDAR sensor, one or more time of flight (ToF) sensor, and one or more structured light sensor. In further non-limiting examples, information relating to the position of the head of the user 510 may be input to the head pose estimator 670 by an inertial measurement unit (IMU) 675. A combination of any of the above exemplified input information may of course be used as input to the head pose estimator 670.

In embodiments wherein a head pose estimator is not comprised in the deep learning system 532, at least one head pose parameter 672 may be obtained from an external device, such as a position and/or orientation measurement unit or a memory connected to the deep learning system, and directly input into the neural network 650, for further processing according to any of the embodiments presented herein.

In one or more embodiments, the deep learning system 532 further comprises a distance estimator 630. In these embodiments, the one or more eye position 622 and the 2D image 610 may be input to the distance estimator 630. In response, the distance estimator 630 may be configured to generate an estimated distance 632, such as a rough distance $d_{rough}$, based on the input one or more eye position 622 and the 2D image 610. To do so, the distance estimator 630 projects the one or more eye detected in the 2D image 610 into a 3D coordinate system centered around the camera, e.g. camera 420. This projection uses the 2D-3D space mapping of the camera. The distance estimator 630 searches for the eye projections in the 3D space where interocular distance (ID) is about the average human ID (e.g., sixty-three millimeters or close to sixty-three millimeters). The distance between the camera and each of these eye projections can be referred to as a projected distance. The rough distance $d_{rough}$ is in these embodiments set as a function of the average human ID and the projected distances.

To illustrate, let $d_{rough}$ refer to the rough distance and K to the intrinsic camera matrix, and $e_{left}$ and $e_{right}$ the detected eyes in the 2D image 610. K is a component of the camera's 2D-3D space mapping. The projected left and right eyes $e'_{left,proj}$ and $e'_{right,proj}$ are computed as $e'_{left,proj}=K^{-1}e_{left}$ and $e'_{right,proj}=K^{-1}e_{right}$ and represent eye vectors projected from detected eyes in the 2D image 610 into the 3D coordinate system centered around the camera. These projected eyes are normalized as $e_{left,proj}=e'_{left,proj}/\|e'_{left,proj}\|$ and $e_{right,proj}=e'_{right,proj}/\|e'_{right,proj}\|$. The rough distance may be computed as $d_{rough}=ID/\|e_{left,proj}-e_{right,proj}\|$.

Alternatively, a rough distance $d_{rough}$ may be obtained from the head pose estimator 670. Alternatively, a rough distance $d_{rough}$ may be obtained based on the true inter pupillary distance of the user 510. Alternatively, a rough distance $d_{rough}$ may be obtained using any kind of depth sensor, such as a ToF sensor, a LIDAR sensor, structured light technology, or the like. Alternatively, a rough distance $d_{rough}$ may be obtained through estimation based on the iris size of a user eye, as the iris size of a human is known to have an average of approximately 12 mm. A combination of any of the exemplified alternative methods for obtaining a rough estimate may also be used.

The processor 310 may be configured to obtain a rough distance according to any of the method embodiments described herein.

The image generator 640 receives the 2D image 610 and, in response, is configured to generate a first eye image 1100 around the first eye 100 of a user 510 and, optionally, a second eye image 1200 around the second eye 200 of the user 510. In some embodiments, image generator 640 is further configured to generate a face image 680 around or comprising at least the major part of the user's face. In an example, the image generator 640 accesses from local memory, e.g. memory 340, a first predefined distance s in pixels for the first and, if applicable, second eye images 1100, 1200. If a face image 680 has been generated, the image generator 640 further accesses from the local memory a second predefined distance s2 in pixels for the face image. These predefined distances s, s2 are different inter-ocular distances in pixels, such that the first and second eye images 1100, 1200 and the face image 680 are at different projections in the 3D space and have different resolution (the resolution of the first and second eye images 1100, 1200 being higher than that of the face image 680, by using a smaller first predefined distance s relative to the second predefined distance s2). The image generator 640 uses these predefined distances s, s2 to generate the first eye image 1100 and, if applicable, the second eye image 1200 and the face image 680, such that they are normalized relative to the camera. In particular, each image 1100, 1200, 680 represents a projection of the 2D image, e.g. 2D image 610, in the 3D coordinate system centered around the camera with which the image has been captured, a rotation of the 2D image around the X-axis (such that any head tilt is rotated to be in the horizontal position), a scaling of the 2D image (based on the predefined distance s or distances s, s2), and optionally processing of the 2D image such that the user eyes and the user face are at the center of each eye image and are not geometrically skewed. In other words, each eye image 1100, 1200 or face image 680 represents a normalized image that can be input to the neural network 650, where the normalization decouples the dependency of this input to the camera configuration (e.g., image resolution, focal length, distance to a screen, camera type such as pinhole and non-pinhole, and the like).

To illustrate, the image generator 640 generates a rotation matrix R that rotates points from the real 3D space (e.g., the 3D coordinate system centered around the camera) to a normalized 3D space (e.g., a 3D coordinate system also centered around the camera but rotated relative to the 3D real space such that the vector between the user eyes in the 2D image 610 is horizontal). The image generator 640 also generates a respective scaling matrix M, M2 based on the predefined distance s and, if applicable, s2 (typically, a matrix M is generated for the user eyes and another matrix M2 is, if a face image 680 has been generated and s2 has been obtained from the local memory, generated for the user face). For example, M (and possibly M2) is generated as a diagonal matrix, where M=dig ([1,1, f]), where f is a focal length selected to make the interocular distance between the users eyes to be equal to the predefined distance s (or s2). A transformation T is defined as a function of the intrinsic matrix K, the rotation matrix R, and the scaling matrix M, M2 and is used to normalize the 2D image 610 into a normalized image (for the user eye depending on the M matrix and for the user face depending on the M2 matrix). For example, the transformation T is expressed as $T=MRK^{-1}$ and is applied to the 2D image 610 to generate a first normalized image at the first predefined distance s for the user eyes and, if applicable, a second normalized image at the second predefined distance s2 for the user face. Each of these normalized images is a rotation and a projection of the 2D image 610 from the real 3D space to the normalized 3D space, where the rotated and projected image is at the respective predefined distance s, s2 in the normalized 3D space. The image generator 640 generates a first eye image 1100 and, if applicable, the second eye image 1200 by processing the normalized user eye image using bilinear interpolation and crop out a W×H region centered around the respective one of the user eyes 100, 200. Similarly, the image generator 640, if applicable, generates the face image 680 by processing the normalized user face image using bilinear interpolation and crop out a W×H region centered around the middle point between the user eyes.

Furthermore, in some embodiments one of the first and second eye images 1100, 1200 is mirrored such that the resulting mirrored image aligns with the other (un-mirrored) eye image. For example, an eye image comprising the left eye is mirrored. As a result, the inner canthus of the left eye aligns with the inner canthus of the right eye, and the outer canthus of the left eye aligns with the outer canthus of the right eye. By having this alignment, an eye image 1100, 1200 input to the neural network 650 is the same in terms of orientation irrespective of which eye the image comprises, thereby simplifying the architecture and the training of the neural network 650.

In different embodiments the first eye image 1100, and optionally also the second eye image 1200, and optionally further a face image 680 are input to the neural network 650. In an example, the 2D image 610 is input to the neural network 650. In response, the neural network 650 may in one or more embodiments output a 2D gaze vector 752 for the first eye 100 and, if applicable, a 2D gaze vector 754 for the second eye 200. Each of the 2D gaze vectors 752, 754 has a gaze origin (e.g., the center of the pupil or a glint) and a gaze direction in the corresponding eye cropped image (the origin and direction are in the 2D plane of this image and can be traced back to the real 3D space).

In some embodiments, the neural network 650 further outputs a distance correction c. The distance correction c is a multiplicative correction factor that can be multiplied with the estimated distance 632 to correct this estimate and generate a corrected distance.

In an example, the neural network 650 may be a convolutional neural network and includes multiple sub-networks (e.g., along parallel branches of the neural network 650). These sub-networks (and, equivalently, the whole convolutional neural network) can be trained in conjunction. Examples of a network architecture is illustrated in FIGS. 7a, 7b and 7c, comprising a neural network, NN, module 720 optionally comprising separate sub-networks in the form of a first sub-network 722 configured to receive the first eye image 1100 and output a first feature vector FV1, and, if applicable, a second sub-network 724 (included in the embodiments of FIGS. 7b and 7c) configured to receive the second eye image 1200 and output a second feature vector FV2. In some embodiments, there is further provided an optional third sub-network 726 (included in the embodiment of 7c) configured to receive a face image 680 and output a third feature vector FV3. The neural network 650 further comprises a concatenation layer, CC layer, 730 configured to concatenate the feature vectors FV1, FV2, FV3 and at least one head pose parameter 672 into a resulting feature vector $FV_{RESULT}$. Advantageously, the at least one head pose parameter 672 is/are already in a feature vector format, and therefore does not need to be preprocessed by any separate sub-network before being input into the concatenation layer 730 and a following fully connected module 740. The fully connected module 740 of the neural network 650 is configured to take as input the resulting feature vector $FV_{RESULT}$ and to generate as output 2D gaze information for the at least one eye 100, 200. Optionally, the fully connected module 740 is further configured to generate a distance correction c.

Examples of the training are further described in connection with FIGS. 9 and 10. Each of the first and second eye images 1100, 1200 is input to a sub-network 722, 724. These eye images 1100, 1200 can be input in conjunction (e.g., the two images as parallel inputs) or separately from each other (e.g., one image input at a time, where the first sub-network would predict the gaze direction from that image). In response, the sub-network is configured to generate a respective 2D gaze vector 752, 754 per eye (e.g., corresponding to the at least one user eye 100, 200 shown in the input image). Each 2D gaze vector can be expressed as a 2D gaze origin o2D (e.g., the user eye 2D location in the image plane) and a 2D gaze direction d2D. In some embodiments, the face image 680 is also input to a sub-network that is configured to, in response, generate the distance correction c. In other embodiments, the head pose estimator 670 is configured to generate the distance correction c based on the input at least one head pose parameters 672. In some embodiments, the face image 680 is input into the head pose estimator 670, wherein the head pose estimator 670 is configured to, in response, generate the distance correction c. A combination of any of these options for obtaining a distance correction c is also possible. Hence, the output from the neural network includes up to five components: a 2D gaze origin o2D and a 2D gaze direction d2D per eye 100, 200 and a distance correction c.

The at least one 2D gaze vector 752, 754, and optionally the estimated distance 632 and the distance correction c are input to the 3D gaze generator 660. In response, the 3D gaze generator 660 generates and outputs a 3D gaze 662. In an example, the 3D gaze 662 includes a 3D gaze direction per user eye (which can be expressed in the 3D real space) and a 3D position of the user eye (which can also be expressed in the 3D real space).

To illustrate, a corrected distance $d_{corr}$ may be generated as $d_{corr}=d_{rough}\times c$. Referring to one of the eyes and its 2D gaze vector, the 3D gaze generator 660 computes its 3D gaze based on the rough distance $d_{rough}$ or, if this has been calculated, the corrected distance and the 2D to 3D space mapping (e.g., the relevant matrices). For instance, the 3D gaze origin $O_{3D,N}$ in the normalized 3D space is computed as $o'_{3D,N}=M^{-1}o_{2D}$ and $o_{3D,N}=o'_{3D,N}/\|o'_{3D,N}\|d_{corr}$. To generate the 3D gaze direction in the normalized 3D space, a normalized basis vector (X, Y, Z) is generated first, where $Z'=M^{-1}o_{2D}$, $Y'=[0,1,0]^T\times Z'$, and $X'=Y'\times Z'$ and $X=X'/\|X'\|$, $Y=Y'/\|Y'\|$, and $Z=Z'/\|Z'\|$. A normalized 3D gaze direction $d_{3D,N}$ is generated as $d'_{3D,N}=[X, Y]d_{2D}-Z$ and $d_{3D,N}=d'_{3D,N}/\|d'_{3D,N}\|$. The 3D gaze original and the 3D gaze direction are mapped from the normalized 3D space to the real 3D space based on the rotation matrix R. For instance, the 3D gaze origin $o_{3D}$ in the real 3D space is computed as $o_{3D}=R^{-1}o_{3D,N}$. Similarly, the 3D gaze direction $d_{3D}$ in the real 3D space is computed as $d_{3D}=R^{-1}d_{3D,N}$.

As mentioned above, FIGS. 7a to c illustrate example network architectures for a neural network 650, according to different embodiments.

As illustrated in the embodiment of FIG. 7a, a first eye image 1100 and at least one head pose parameter 672 are input to the concatenation layer 730 of the neural network 650, and then processed by the fully connected module 740, which is configured to generate as output a first 2D gaze vector 752 and, optionally, also a distance correction c.

The embodiment of FIG. 7b differs from that of FIG. 7a in that also a second eye image 1200 is input to the concatenation layer 730 of the neural network 650, and then processed by the fully connected module 740, and in that the fully connected module 740 is further configured to generate as output a second 2D gaze vector 754.

The embodiment of FIG. 7c differs from that of FIG. 7b in that also a face image 680 is input into the concatenation layer 730 of the neural network 650 and in that the fully connected layer 740 is configured to generate the distance correction c also based on the face image 680. The first eye image 1100 and the second eye image 1200 may in this embodiment have a high resolution, and the face image 680 may have a low resolution (where, "low" and "high" are relative term, such as "low resolution" refers to being lower than the "high resolution"). The face image 680 may in these embodiments be used to help the neural network 650 in estimating at least one head pose parameter 672, typically including yaw. However, the face image 680 is not necessary for the solutions according to the embodiments presented herein to work. Also, a dedicated head pose algorithm, for example implemented in the head pose estimator 670, will provide higher quality head pose parameters 672 than using only a face image as input to the neural network 650.

The first and second eye images 1100 and 1200 may be centered on the eye detections, $x=e_{left\ or\ right}$ scaled to an interocular distance of s=320 pixels and cropped to 224×112 pixels. The second eye image 1200 may be mirrored 716 by modifying the rotation matrix R. This provides the neural network 650 with a consistent appearance of the input eye images. The face image 680 may be centered on the midpoint between the eye detections, scaled to =84 pixels and cropped to 224×56 pixels.

In one or more embodiments, the neural network 650 includes as part of its NN module 720 separate sub-networks 722-724 for the eyes (shown as sub-network 722 for the first eye and sub-network 724 for the second eye, with tied weights) and optionally also a sub-network 726 for the face (shown as Third NN 726). The separate sub-networks, or the NN module, may comprise convolutional neural networks (CNNs), in which case they may be the convolutional part of ResNet-18, similarly to what is described in K. He, X. Zhang, S. Ren, and J. Sun. "Deep residual learning for image recognition," CoRR, abs/1512.03385, 2015, the content of which is incorporated herein by reference. In the embodiment of FIG. 7a, the first eye image 1100 is the only input that needs preprocessing by the NN module 720. Hence, no separate sub-networks within the NN module 720 need to be defined. In the embodiment of FIG. 7b, a first eye image 1100 and a second eye image 1200 are input into the NN module 720, which may then comprise two separate sub-networks 722 and 724 for separately processing the respective eye images 1100 and 1200. In the embodiment of FIG. 7c, a first eye image 1100, a second eye image 1200 and a face image 680 are input into the NN module 720, which may then comprise three separate sub-networks 722, 724 and 726 for separately processing the respective eye images 1100, 1200 and the face image 680.

The output from all NNs, in different embodiments comprising the NN module 720 for the first eye, sub-networks 722 and 724 for both eyes, or sub-networks 722-726 for both eyes and the face, are concatenated through the concatenation layer 730 into a resulting feature vector $FV_{RESULT}$ which is fed to a fully connected module 740. In some embodiments, wherein a set of "n" calibration parameters have been generated, according to embodiments described herein, these calibration parameters may also be concatenated with the output from the NN 720 or NN sub-networks 722, 724, 726 through the concatenation layer 730, into the resulting feature vector $FV_{RESULT}$. At least one head pose parameter 672, as described herein, is also fed to the fully connected module 740. The fully connected module 740 is configured to predict 2D gaze information and in some embodiments also a distance correction c based on the input from the concatenation layer 730. The output from the one or more eye NN 722, 724 may be concatenated with a set of "n" personal calibration parameters and the distance correction c. In the optional embodiments of FIGS. 7b and 7c, indicated by the dashed arrows and dashed boxes 732, 734 and possibly 736, the concatenation for the first eye image 1100 and the second eye image 1200 is through a first concatenation layer 732 and a second concatenation layer 734, respectively, as an alternative to concatenating the output from the NN module 720 into a single resulting feature vector directly through the concatenation layer 730. In this optional embodiment, the combined feature vector resulting from each concatenation is further fed to the fully connected module 740. Hereinafter, when referring to the resulting feature vector $FV_{RESULT}$, this may refer to any of the single resulting feature vector obtained directly through the concatenation layer 730, or the combination of multiple feature vectors obtained through the first and second concatenation layers 732, 734, and possibly 736.

The fully connected module 740 can be described as: FC(3072)-BN-ReLU-DO(0.5)-FC(3072)-BN-ReLU-DO (0.5)-FC({4, 1}). The output from the FC module 740, and hence from the neural network 650, is the 2D gaze origin and the 2D gaze direction and, if applicable, the distance correction c.

To illustrate an example of image normalization of an eye image, according to an embodiment, a real 3D space may be centered around a camera 420 that generates a first eye image 1100 comprising a first eye 100 of a user 510. The 3D space can be defined as a 3D coordinate system. A normalized 3D space is also centered around the camera 420 and is generated from the real 3D space based on a rotation matrix R. For example, the normalized 3D space corresponds to a rotation of the real 3D space along one of the axis (e.g., the Y axis) of the real 3D space. A normalized image is projected from the real image in the normalized 3D space. In the case where this normalized image corresponds to location where the interocular distance between the two eyes is the average human ID of about 63 mm, the distance between the camera 420 and the center of the eye in the normalized image first eye image 1100 is the rough distance $d_{rough}$.

Figure 10:
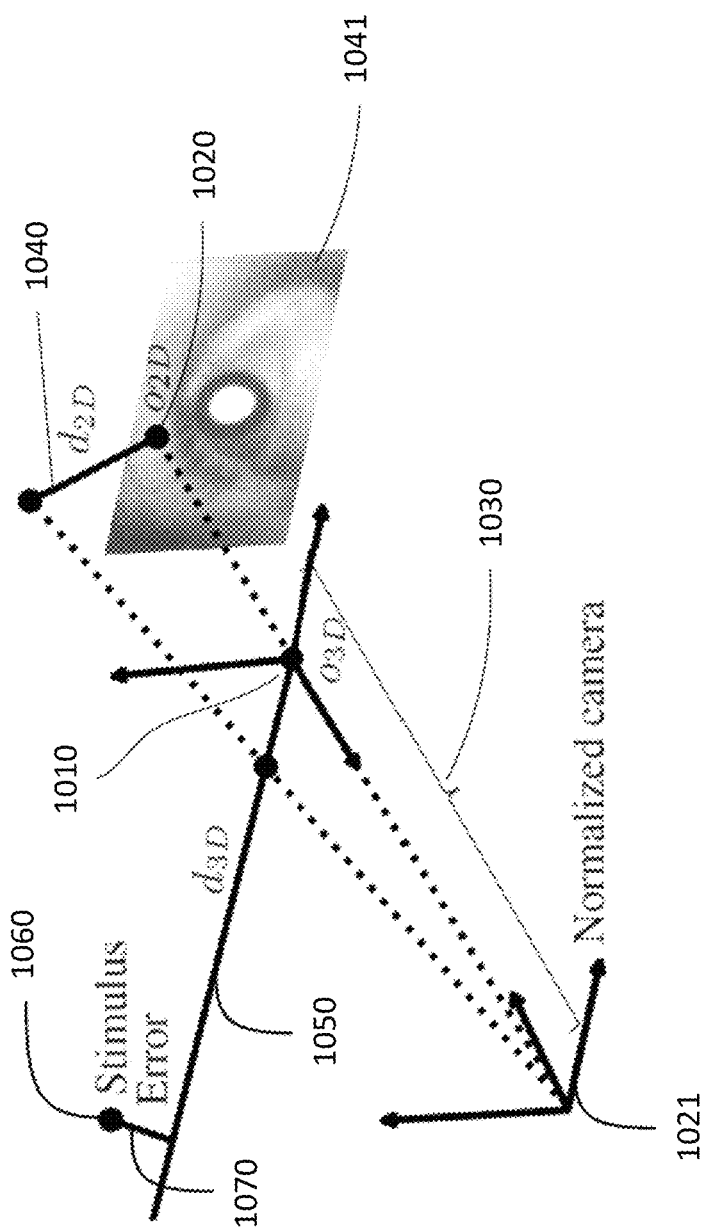
FIG. 10 illustrates an example 3D gaze prediction, according to an embodiment.

FIG. 10 illustrates an example 3D gaze prediction, according to an embodiment. As illustrated, a normalized 3D space 1021 is used, although the prediction can be mapped to the real 3D space by using the inverse of the rotation matrix R as described in connection with FIG. 6. A 3D gaze origin 1010 is derived from a 2D gaze origin 1020 based on the inverse of a scaling matrix M and a distance 1030, which may be the rough distance $d_{rough}$ or the corrected distance c. The 2D gaze origin 1020 and a 2D gaze direction 1040 represent a 2D gaze vector in the plane of a normalized eye image 1041, which may e.g. be the first eye image 1100 or the second eye image 1200 after normalization. A 3D gaze direction 1050 is derived from the 2D gaze origin 1020 and the 2D gaze direction 1040 based on the inverse of the scaling matrix M as described in connection with FIG. 6.

The network is trained to minimize the mean minimum miss-distance between the predicted gaze lines and the ground-truth stimulus points.

During training, a 3D gaze line, or 3D gaze ray, is projected from the 3D gaze origin 1010 along the 3D gaze direction 1050. A stimulus point 1060 for the gaze is known (e.g., a known gaze point). The distance 1070 (e.g., the shortest distance) between the stimulus point 1060 and the 3D gaze line is a distance parameter of the loss function. The loss function is minimized by minimizing this distance 1070; e.g., if the neural network properly predicts the 3D gaze, the distance 1070 would be zero and the stimulus point 1060 would fall on the 3D gaze ray.

FIG. 8 illustrates an example flow for predicting 3D gaze based on a deep learning system such as the deep learning system 532, in accordance with one or more embodiments. An eye tracking system 300 is described as performing the operations of the example flow. In an example, the eye tracking system 300 hosts the deep learning system 532. In another example, a remote computer system hosts the deep learning system 532 and the eye tracking system 300 interacts with this remote computer system over a data network to provide a 2D image and receive a 3D gaze prediction. In yet another example, the deep learning system 532 is distributed between the eye tracking system 300 and the remote computer system (e.g., the remote computer system may host the neural network 650 while the eye tracking system 300 may host the remaining component of the deep learning system 532).

Instructions for performing the operations of the illustrative flow of FIG. 8 can be stored as computer-readable instructions on a non-transitory computer-readable medium of the eye tracking system 300. As stored, the instructions represent programmable modules that include code or data executable by a processor(s) 310 of the eye tracking system 300. The execution of such instructions configures the eye tracking system 300 to perform the specific operations shown in the figure and described herein. Each programmable module in combination with the processor 310 represents a means for performing a respective operation(s). While the operations are illustrated in a particular order, it should be understood that depending on circumstances, some of the operations may be omitted, skipped, and/or reordered.

The method according to the example flow of FIG. 8 comprises:

In step 802: obtaining, by a head pose prediction algorithm, at least one head pose parameter 672, the at least one head pose parameter 672 comprising one or more of: a head position, pitch, yaw, or roll.

The head pose prediction algorithm is configured to produce as output the at least one head pose parameter 672 in a format that is acceptable as input into a fully connected layer or module comprised in a neural network. This means that each of the at least one head pose parameter 672 is represented as feature vector of numerical representations, e.g. a floating point number or an integer.

If there are two or more head pose parameters 672, and respective two or more feature vectors representing the two or more head pose parameters 672, the two or more head pose parameter feature vectors may either be concatenated (e.g. appended) into a single head pose parameter feature vector, or may comprise one feature vector for each of the one or more head pose parameter 672. The parameters are in any case in a format that is acceptable as input into a fully connected layer or module comprised in a neural network, (this is further described in connection with the concatenation in step 812).

In one or more embodiments, the head position is a three-dimensional (3D) position in space, described using one or more 3D coordinates. In one or more embodiments, the head position is defined in relation to the camera 420 of the eye tracking system 300, thereby indicating the distance between the camera 420 and one or more parts of the head, for example including at least one eye 100, 200 of the user 510.

In different embodiments, the head pose prediction algorithm may be configured to take different types of input, including, but not limited to, at least one of: a 2D image of a face; reflector/sensor data; a depth image obtained using e.g. Lidar/Ladar, time of flight (ToF), or structured light technology; and/or information obtained using an inertial measurement unit (IMU).

If the head pose prediction algorithm is configured to take a 2D image of a face of the user 510 as input, and the 2D image is captured using a camera associated with the eye tracking system 300, then the head pose prediction algorithm will be able to predict orientation (i.e. one or more of pitch, yaw, or roll) and/or position of the head of the user 510, in manners known in the art.

If the head pose prediction algorithm is configured to take a 2D image depicting one or more reflectors positioned on or at the head of the user 510 as input, and the 2D image is captured using a camera associated with the eye tracking system 300, then the head pose prediction algorithm will be able to predict the orientation (i.e. one or more of pitch, yaw, or roll) and/or position of the head of the user 510, in manners known in the art. Reflectors suitable for this purpose may for example be one or more reflectors configured to reflect light detectable by a sensor of a camera connected with the eye tracking system 300.

If the head pose prediction algorithm is configured to take sensor data from one or more sensors positioned on or at the head of the user 510 as input, then the head pose prediction algorithm will be able to predict the orientation (i.e. one or more of pitch, yaw, or roll) and/or position of the head of the user 510, in manners known in the art. Sensors suitable for this purpose may for example be one or more sensor configured to measure or obtain 3D position information.

If the head pose prediction algorithm is configured to take a depth image as input, then the head pose prediction algorithm will be able to predict the position of the head of the user 510, in manners known in the art.

If the head pose prediction algorithm is configured to take information obtained using an IMU as input, then the head pose prediction algorithm will be able to predict the orientation, i.e. one or more of pitch, yaw, or roll, of the head of the user 510, in manners known in the art.

To obtain further accuracy in the head pose prediction, two or more of the alternative approaches exemplified above may be used in combination.

In one or more embodiments, the head position is defined as a three-dimensional (3D) position in space, and is described using one or more 3D coordinates. The head position may be defined in relation to the camera 420 of the eye tracking system 300, thereby indicating the distance between the camera 420 and one or more parts of the head, for example at least one eye 100, 200 of the user 510.

In step 804: generating, by the eye tracking system 300, a first eye image 1100 comprising a first eye 100 of a user 510 based on a first two dimensional, 2D, image 610, wherein the 2D image 610 is generated by a camera 420 associated with the eye tracking system 300.

The first 2D image 610 may be received or retrieved by the eye tracking system 300 from the camera 420, or from an intermediate storage, such as e.g. the storage device or memory 340.

The camera 420 associated with the eye tracking system 300 may e.g. be a camera integrated or interfacing with the eye tracking system 300.

The 2D image 610 shows at least one user eye. In embodiments where one camera 420 is associated with two user eyes 100, 200, the 2D image 610 shows both eyes 100, 200; when the camera 420 is associated with one user eye, as in the case of a head mounted device such as a VR, AR, MR or other XR headset, the 2D image 610 may show only that user eye.

In one or more embodiment, generating, by the eye tracking system 300, the first eye image 1100 comprising the first eye 100 of a user 510 based on a first 2D image 610 may comprise cropping the first 2D image 610 around the user eye 100. In some embodiments, the first eye image 1100 is generated such that it is centered on the eye 100 of the user 510.

For example, the method may comprise, and the eye tracking system 300 may be configured to, detecting the first eye 100 of the user 510 in the first image 1100 and estimating a rough distance $d_{rough}$ between the camera 420 and the first eye 100 of the user 510 as detected in the 2D image 1100. The method may further comprise, and eye tracking system 300 may further be configured to, projecting the 2D image 1100 in a 3D space based on an intrinsic matrix K of the camera 420; rotating the projected image based on a rotation matrix R, and scaling the rotated image based on a scaling matrix M. The scaling matrix M is in these embodiments generated based on predefined distance S in pixels and the average human inter-ocular distance. The method then comprises, and the eye tracking system 300 is then configured to, optionally processing the scaled image using bilinear interpretation and cropping the processed image around the detected first eye 100 of the user 510 based on a predefined region, e.g., one having predefined width and height. The resulting image has a first image resolution that depends on the predefined distance S.

In some embodiments, the eye tracking system 300 is further configured to generate a face image 680 comprising the face of the user 510 from the 2D image 610. The face image 680 shows the user face or at least both user eyes 100, 200 and preferably has a second image resolution lower than the first image resolution.

In step 806: inputting, by the eye tracking system 300 to a neural network, NN, 650 the first eye image 1100, wherein the NN 650 is configured to convert the first eye image 1100 into a first feature vector FV1.

The neural network 650 is already trained to predict and a 2D gaze origin and a 2D gaze direction for an eye, or two eyes, based on the at least one head pose parameter in combination with the associated first eye image 1100; the first and second eye images 1100, 1200; or the first and second eye images 1100, 1200 and the face image 680, according to any of the method embodiments presented herein. In some embodiments, the neural network is likewise already trained to predict a distance correction c, according to any of the method embodiments presented herein. Generally, the distance correction c is used to correct the estimated rough distance $d_{rough}$ and is predicted based on the first eye image 1100 image and, if available, the second eye image 1200. In some optional embodiments, the prediction of the distance correction c is also based on the face image 680, if this is available to the eye tracking system 300. The 2D gaze origin and the 2D gaze direction for the user eye 100 (and, similarly, for the second user eye 200) is may be generated from the first eye image 1100 (and, similarly for a second eye 200, from the second eye image 1200) separately from the second eye image 1200 and the face image 680 (and, similarly for the second eye 200, separately from the first eye image 1100 and face image 680).

In an example, the neural network 650 is also trained based on "n" calibration parameters, as described in connection with FIGS. 9 and 10, which become embedded in the neural network. During a calibration of the eye tracking system 300, this system 300 generates a plurality of calibration images by instructing the user to gaze at known gaze points. The calibration images may also be normalized and cropped in the same manner as described for the first eye image 1100 herein, and are input to the neural network 650. The "n" calibration parameters are adjusted such that the loss function of the neural network 650 is minimized. This minimization uses the known gaze points as ground truth. Once the first 2D image 610 is received by the eye tracking system at step 804 and processed through the remaining steps of FIG. 8, the prediction of the neural network 650 at operation 814 may then use the "n" calibration parameters.

If the first 2D image 610 also shows a second eye 200 of the user 510, the method may comprise the optional steps 808 and 810, which comprise:

If the first 2D image 610 shows a second user eye 200, the method may continue with the optional steps 808 and 810. Otherwise, the method continues with step 812.

In optional step 808: generating, by the eye tracking system 300, a second eye image 1200 comprising the second eye 200 of the user 510, based on the first 2D image 610.

Optional step 806 relating to the second eye image 1200 may be performed according to any of the embodiments described relating to the first eye image 1100 in Step 804.

The second eye image 1200 shows the second eye 200 of the user 510 and typically has the first image resolution.

In an optional step 810: inputting, by the eye tracking system 300 to the fully connected module 740 comprised in the neural network 650, the second eye image 1200, wherein the fully connected module 740 of the neural network 650 is further configured to convert the second eye image 1200 into a second feature vector FV2.

In step 812: inputting, by the eye tracking system 300 to the concatenation layer 730 comprised in the NN 650, the obtained at least one head pose parameter 672 and the first feature vector FV1, wherein the concatenation layer 730 is configured to generate a resulting feature vector $FV_{RESULT}$, by concatenating the obtained at least one head pose parameter 672 and the first feature vector FV1.

Concatenating feature vectors may in this context be understood as appending more than one feature vector into a single resulting feature vector.

Step 812 comprises concatenating, to generate resulting feature vector $FV_{RESULT}$, the following:
- the feature vector or vectors representing the at least one head pose parameter 672;
- the first feature vector FV1 representing the first eye image 1100;
- if steps 808 and 810 have been performed, also the second feature vector FV2 representing the second eye image 1200; and, optionally
- with a set of "n" personal calibration parameters, as described herein, if such personal calibration parameters have been generated.

In step 814: inputting, by the eye tracking system 300 to a fully connected, FC, module 740 comprised in the neural network 650, the generated resulting feature vector $FV_{RESULT}$, wherein the FC module 740 of the neural network 650 is configured to predict a 2D gaze origin of the first eye 100 of the user 510 in the first eye image 1100, and a 2D gaze direction of the first eye 100 of the user 510 in the first eye image 1100 based on the resulting feature vector $FV_{RESULT}$.

In the embodiments where this is applicable, the FC module 740 of the neural network 650 is further configured to predict a 2D gaze origin of the second eye 200 of the user 510 in the second eye image 1200, and a 2D gaze direction of the second eye 200 of the user 510 in the second eye image 1200 based on the resulting feature vector $FV_{RESULT}$.

In one or more embodiment, the FC module 740 of the neural network 650 is further configured to predict a distance correction c based on the resulting feature vector $FV_{RESULT}$. If the eye tracking system 300 is a remote system, the distance correction prediction will typically be performed as a part of the method, as having a highly accurate distance estimate is crucial to the performance accuracy of a remote eye tracking system. On the other hand, if the eye tracking system 300 is comprised in a head mounted device, distance estimation is easier due to the close to static relation between parts of the system 300 and the eyes of the user 510. The distance correction prediction is therefore an optional feature in such head mounted applications.

Hence, the eye tracking system 300 receives from the neural network 650 the 2D gaze origin and 2D gaze direction for the user eye and, as applicable, the 2D gaze origin and 2D gaze direction for the second user eye. The eye tracking system optionally also receives from the neural network the distance correction c.

If a distance correction c is predicted by the neural network 650 in step 814, the method continues with step 816. Otherwise, the method continues with step 818.

In an optional step 816: generating, by the eye tracking system, a corrected distance between the first eye 100 of the user 510 and the camera 420 by at least updating an estimated distance based on the distance correction c.

The distance correction c is in some embodiments a correction factor and the method comprises, and/or the eye tracking system 300 is configured to, multiplying the estimated rough distance $d_{rough}$ by this correction factor to generate the corrected distance.

In step 818: generating, by the eye tracking system, 3D gaze information for the first eye 100 of the user 510 based on the 2D gaze origin, the 2D gaze direction.

Optionally, generating, by the eye tracking system, 3D gaze information for the first eye 100 of the user 510 may further be based on the rough distance $d_{rough}$ or the corrected distance.

The 3D gaze information includes a position in the 3D space of the user eye (e.g., 3D gaze origin) and a 3D gaze direction originating from the first user eye 100, or in applicable cases first and second user eyes 100, 200, respectively.

In an example, the 3D gaze origin and 3D gaze direction for the first eye 100 of the user 510 are derived from the distance between the camera 420 and the first eye 100 of the user 510, the 2D gaze origin, and the 2D gaze direction based on the scaling matrix M and the rotation matrix R (or their inverse). This operation can also be repeated to generate a 3D gaze origin and a 3D gaze direction for the second eye 200 of the user 510 based on the distance between the camera 420 and the second eye 200 of the user 510, and its 2D gaze origin and 2D gaze direction. In one or more embodiments, the 3D gaze information includes the 3D gaze origins and 3D gaze directions of both the first and second eye 100, 200 of the user.

The distance between the camera 420 and the first or second eye 100, 200 of the user 510 may in this context be the rough distance $d_{rough}$ estimated based on the first 2D image, or, if this has been generated, the corrected distance. In other words, in embodiments wherein the FC module 740 of the neural network 650 is configured to predict a distance correction c based on the resulting feature vector $FV_{RESULT}$ and step 816 comprises generating, by the eye tracking system, a corrected distance from the first eye 100 of the user 510, and/or the second eye 200 of the user 510, respectively, to the camera 420 by at least updating an estimated distance based on the distance correction c, the generating of the 3D gaze information in step 818 may further be based on the corrected distance.

In an optional step 820 the method may comprise providing, by the eye tracking system 300, the 3D gaze information generated for the first eye 100 of the user 510 and, as applicable, the 3D gaze information generated for the second eye 200 of the user 510 to a 3D gaze application.

The 3D gaze application may e.g. use the 3D gaze information to support stereoscopic displays and 3D applications (e.g., 3D controls and manipulations of displayed objects on a screen).

In one or more embodiments, a neural network 650 of a deep learning system 532 is trained based on training images to predict a distance correction c and a 2D gaze vector (e.g., 2D gaze origin and 2D gaze direction) per user eye. Generally, the training is an iterative across the training images to minimize a loss function and, accordingly, update the parameters of the neural network through back-propagation (e.g., one that uses gradient descent). Because the neural network should predict two outputs (the distance correction c and the 2D gaze vector), relying on training images showing user eyes while gazing at gaze points within 2D planes associated with the cameras that captured these images is insufficient. Instead, diversity of the locations of gaze points relative to the 2D planes is needed for proper training.

Once the training images are generated, they are input to the neural network for the training. In particular, the neural network predicts the gaze angles and in some cases the user eye to-camera distances from these training images. The loss function can be defined based relative to gaze angles and user eye to-camera distances.

In an example, this angle term and the distance term can be replaced with a single distance term. For instance, a predicted gaze line is generated at the predicted distance away from the camera and has the predicted gaze angle. The distance (e.g., the shortest distance) between the gaze point and the predicted gaze line is measured. If the prediction was completely accurate, this gaze point-to-predicted gaze line distance would be zero. However in other cases, the loss function is minimized (and the neural network parameters are updated), by minimizing the gaze point-to-predicted gaze line distance such that the predicted gaze line is as close to the gaze point as possible.

In this example also, the loss function can include a penalty term. More specifically, when an origin of a predicted gaze line falls outside the corresponding training image a penalty is added to the loss function (e.g., the penalty has a predefined value). Likewise, if a predicted distance correction c is over a certain threshold in either direction (e.g., forty percent in either direction), the same or another penalty is added to the loss function.

Figure 9:
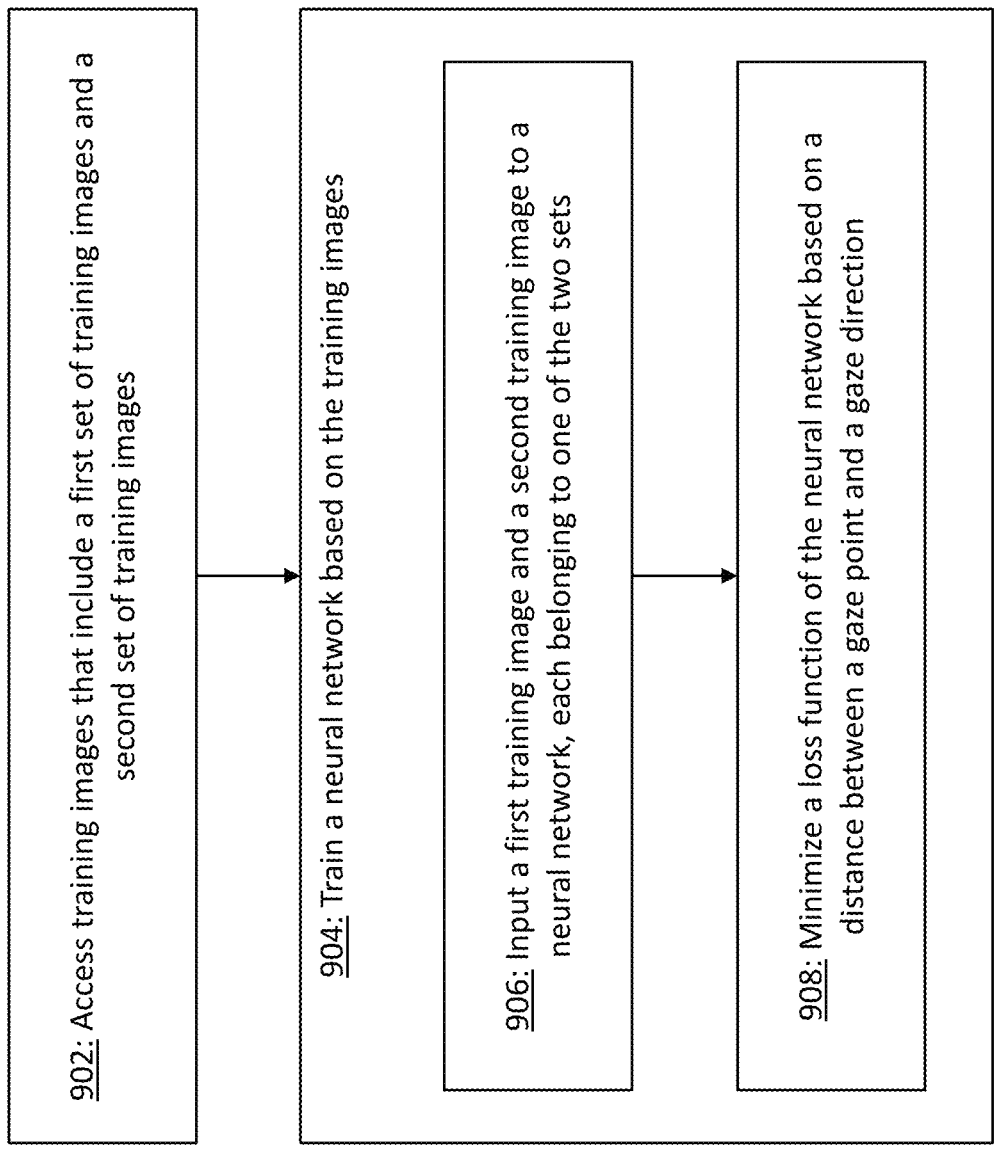
FIG. 9 illustrates an example flow for training a neural network, according to an embodiment.

FIG. 9 illustrates an example flow for training a neural network, according to an embodiment.

A computer system is described as performing the operations of the example flows. In an example, the computer system performs the training and stores code of the neural network. Upon completion of the training, the computer system may receive images from eye tracking system and use the neural network to respond with 3D gaze predictions. Additionally or alternatively, the eye tracking systems may download the code of the neural network from the computer system.

Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the eye computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered.

The example flow of FIG. 9 starts at operation 902, where the computer system accesses training images that include a first set of training images and a second set of training images. Some or all of the training images in the first set show user eyes associated with gaze points in a plane of a camera. Some or all of the training images in the second set show user eyes associated with gaze points outside the plane of the camera. In this way, diversity of training images showing user eyes gazing at gaze points inside and outside the plane is achieved.

At operation 902, the computer system trains the neural network based on the training images. Generally, the training includes updating parameters of the neural network (e.g., weights of connections between nodes across layers of the neural network) to minimize a loss function of the neural network. The loss function can use an angle term and/or a distance term as explained herein. In an example, operation 904 includes two additional operations 906 and 908.

At operation 906, the computer system inputs a first training image and a second training image from the training images to the neural network. The first training image belongs to the first set of training images. The second training image belongs to the second set of training images. In a specific example, the first training image shows the user eye while gazing at a gaze point according to a gaze angle and second training image shows the user eye while gazing at another gaze point according to the gaze angle. In another specific example, the first training image and the second training image show the user eye while gazing at the gaze point in a gaze angle. In this example, the first training image corresponds to a first distance between the camera and the user eye, and the second training image corresponds to a second distance between the camera and the user eye. In yet another specific example, the first training image shows the user eye while gazing at the gaze point according to a gaze angle and the second training image shows the user eye while gazing at another gaze point according to a different gaze angle. In these examples, the first and second training images can be input as a pair.

As used herein in connection with the flow of FIG. 9, a training image refers to a set of training images that includes an image that shows an eye of a person and, optionally, an image of the other eye of the person and an image of the face of the person. In other words, the images used in the training are of similar types that the images that would be used upon completion of the training (and can be generated following similar operations of projecting, rotating, scaling, and cropping.

At operation 908, the computer system minimizes the loss function of the neural network based on a distance between a gaze point and a gaze line. The gaze point is associated with one of the first training image or the second training image. The gaze line is predicted by the neural network for a user eye from the one of the first training image or the second training image. Operations 906-908 are repeated across many if not all of the training images to complete the training of the neural network.

The disclosure has now been described in detail for the purposes of clarity and understanding. However, it will be appreciated that certain changes and modifications may be practiced within the scope of the appended claims.

The above description provides exemplary embodiments only, and is not intended to limit the scope, applicability or configuration of the disclosure. Rather, the above description of the exemplary embodiments will provide those skilled in the art with an enabling description for implementing one or more exemplary embodiments. It is understood that various changes may be made in the function and arrangement of elements without departing from the spirit and scope of the disclosure as set forth herein.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the disclosure may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the disclosure may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor or processors may perform the necessary tasks.

As used herein, the phrase "a first thing based on a second thing," and the like, may mean that the first thing is based solely on the second thing, or that the first thing is based on the second thing as well as one or more additional things.

The processing circuitry, or one or more processors 310, may in one or more embodiment be configured to perform any or all of the method embodiments described in connection with FIG. 8.

It will be appreciated that the system 300 described above with reference to FIGS. 3a, 3b and 3c is provided as an example, and that many other systems may be envisaged. For example, the system 300 may consist only of the processing circuitry or processor 310.

The invention claimed is:

1. A computer implemented method for detecting three dimensional, 3D, gaze, using an eye tracking system the computer-implemented method comprising:
   obtaining, by a head pose prediction algorithm, at least one head pose parameter, the at least one head pose parameter comprising one or more of: a head position, pitch, yaw, or roll;
   generating, by the eye tracking system, a first eye image comprising a first eye of a user based on a first two dimensional, 2D, image, wherein the first 2D image is generated by an image sensor associated with the eye tracking system;
   inputting, by the eye tracking system to a neural network, NN, the first eye image, wherein the NN is configured to convert the first eye image into a first feature vector;
   inputting, by the eye tracking system to a concatenation layer comprised in the NN, the obtained at least one head pose parameter and the first feature vector, wherein the concatenation layer is configured to generate a resulting feature vector, by concatenating the obtained at least one head pose parameter and the first feature vector;
   inputting, by the eye tracking system to a fully connected, FC, module comprised in the neural network, the generated resulting feature vector, wherein the FC module of the neural network is configured to predict a 2D gaze origin of the first eye of the user in the first eye image, and a 2D gaze direction of the first eye of the user in the first eye image based on the resulting feature vector; and generating, by the eye tracking system, 3D gaze information for the first eye of the user based on the 2D gaze origin and the 2D gaze direction.

2. The computer-implemented method of claim 1, wherein the FC module of the neural network is further configured to predict a distance correction based on the resulting feature vector; wherein the method further comprises generating, by the eye tracking system, a corrected distance between the first eye of the user and the image sensor by at least updating an estimated distance based on the distance correction; and wherein generating, by the eye tracking system, 3D gaze information for the first eye of the user is further based on the corrected distance.

3. The computer-implemented method of claim 2, further comprising:

determining, by the eye tracking system, the estimated distance between the image sensor and the first eye of the user based on the first 2D image; and estimating, by the eye tracking system, a position of the first eye of the user in a 3D space based on the corrected distance and on a position of the image sensor in the 3D space, wherein the 3D gaze information comprises the position of the first eye of the user in the 3D space.

4. The computer-implemented method of claim 1, further comprising estimating, by the eye tracking system, a 3D gaze direction from a position of the first eye of the user in a 3D space based on the 2D gaze origin and the 2D gaze direction, wherein the 3D gaze information comprises the 3D gaze direction.

5. The computer-implemented method of claim 1, wherein generating the first eye image comprises normalizing the first 2D image to generate a normalized image and cropping the normalized image around the first eye of the user.

6. The computer-implemented method of claim 1, wherein the first 2D image further shows a second eye of the user, and wherein the method further comprises:

generating, by the eye tracking system, a second eye image comprising the second eye of the user, based on the first 2D image; and inputting, by the eye tracking system to the fully connected module comprised in the neural network, the second eye image, wherein the fully connected module of the neural network is further configured to convert the second eye image into a second feature vector;

inputting, by the eye tracking system to a concatenation layer comprised in the NN, also the second feature vector, wherein the concatenation layer is configured to generate the resulting feature vector, by concatenating the obtained at least one head pose parameter, the first feature vector and the second feature vector.

7. The computer-implemented method of claim 6, further comprising:

generating, by the eye tracking system, a second position of the second eye of the user in a 3D space and a second gaze direction from the second position in the 3D space based on a corrected distance, and wherein the 3D gaze information comprises the second position and the second gaze direction.

8. The computer-implemented method of claim 7, wherein the second eye image is a mirrored image around the second eye of the user.

9. The computer-implemented method of claim 5, wherein the first eye image and the second eye image are generated at a first image resolution, based on a first predefined distance associated with projecting the first eye image and the second eye image in a 3D gaze space.

10. The computer-implemented method of claim 6, wherein the neural network is further configured to predict a second 2D gaze origin and a second 2D gaze direction of the second eye of the user in the second eye image based on the first eye image and the second eye image.

11. The computer-implemented method of claim 6, wherein the neural network is further configured to predict a second 2D gaze origin and a second 2D gaze direction of the second eye in the second eye image based on the second eye image and independently of the first eye image.

12. An eye tracking system for detecting three dimensional, 3D, gaze, comprising:

an image sensor;

a processor; and a memory storing computer-readable instructions that, upon execution by the processor, cause the eye tracking system to perform operations comprising:

obtaining, by a head pose prediction algorithm, at least one head pose parameter, the at least one head pose parameter comprising one or more of: a head position, pitch, yaw, or roll;

generating, by the eye tracking system, a first eye image comprising a first eye of a user based on a first two dimensional, 2D, image, wherein the first 2D image is generated by an image sensor;

inputting, by the eye tracking system to a neural network, NN, the first eye image, wherein the NN is configured to convert the first eye image into a first feature vector;

inputting, by the eye tracking system to a concatenation layer comprised in the NN, the obtained at least one head pose parameter and the first feature vector, wherein the concatenation layer is configured to generate a resulting feature vector, by concatenating the obtained at least one head pose parameter and the first feature vector;

inputting, by the eye tracking system to a fully connected, FC, module comprised in the neural network, the generated resulting feature vector, wherein the FC module of the neural network is configured to predict a 2D gaze origin of the first eye of the user in the first eye image, and a 2D gaze direction of the first eye of the user in the first eye image based on the resulting feature vector; and generating, by the eye tracking system, 3D gaze information for the first eye of the user based on the 2D gaze origin and the 2D gaze direction.

13. The eye tracking system of claim 12, wherein the FC module of the neural network is further configured to predict a distance correction based on the resulting feature vector and wherein the memory is further configured to store computer-readable instructions that, upon execution by the processor, cause the eye tracking system to perform operations comprising:

generating, by the eye tracking system, a corrected distance between the first eye of the user and the image sensor by at least updating an estimated distance based on the distance correction;

wherein generating, by the eye tracking system, 3D gaze information for the first eye of the user is further based on the corrected distance.

14. The eye tracking system of claim 13, wherein the neural network is hosted on a remote system, wherein inputting the first eye image comprises transmitting the first eye image to the remote system over a data network, and wherein the operations further comprise receiving the distance correction, the 2D gaze origin, and the 2D gaze direction from the remote system over the data network.

15. A non-transitory computer-readable storage medium comprising instructions, that upon execution on a computer system, configure the computer system to perform operations comprising:
- obtaining, by a head pose prediction algorithm, at least one head pose parameter, the at least one head pose parameter comprising one or more of: a head position, pitch, yaw, or roll;
- generating, by an eye tracking system, a first eye image comprising a first eye of a user based on a first two dimensional, 2D, image, wherein the first 2D image is generated by an image sensor;
- inputting, by the eye tracking system to a neural network, NN, the first eye image, wherein the NN is configured to convert the first eye image into a first feature vector;
- inputting, by the eye tracking system to a concatenation layer comprised in the NN, the obtained at least one head pose parameter and the first feature vector, wherein the concatenation layer is configured to generate a resulting feature vector, by concatenating the obtained at least one head pose parameter and the first feature vector;
- inputting, by the eye tracking system to a fully connected, FC, module comprised in the neural network, the generated resulting feature vector, wherein the FC module of the neural network is configured to predict a 2D gaze origin of the first eye of the user in the first eye image, and a 2D gaze direction of the first eye of the user in the first eye image based on the resulting feature vector; and
- generating, by the eye tracking system, 3D gaze information for the first eye of the user based on the 2D gaze origin and the 2D gaze direction.

* * * * *